(12) United States Patent
Rahman

(10) Patent No.: US 7,920,876 B2
(45) Date of Patent: *Apr. 5, 2011

(54) SYSTEM AND METHOD FOR EVALUATING ACCURACY OF AN AUTOMATIC LOCATION IDENTIFICATION SYSTEM

(75) Inventor: Iftekhar Rahman, Billerica, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 521 days.

This patent is subject to a terminal disclaimer.

(21) Appl. No.: 11/944,030

(22) Filed: Nov. 21, 2007

(65) Prior Publication Data

US 2009/0047925 A1 Feb. 19, 2009

Related U.S. Application Data

(63) Continuation of application No. 10/603,131, filed on Jun. 24, 2003, now Pat. No. 7,313,402.

(51) Int. Cl.
*H04Q 7/20* (2006.01)

(52) U.S. Cl. ............... 455/456.1; 455/67.11; 455/67.14; 455/456.3; 455/512

(58) Field of Classification Search ............... 455/67.11, 455/67.14, 224, 422.1, 456.1, 456.3, 456.5, 455/512, 517

See application file for complete search history.

(56) References Cited

U.S. PATENT DOCUMENTS

| | | | | |
|---|---|---|---|---|
| 5,579,368 A * | 11/1996 | van Berkum | ................. | 379/9.06 |
| 5,734,698 A * | 3/1998 | Kobayashi et al. | ............. | 379/45 |
| 6,424,837 B1 * | 7/2002 | Hall et al. | ................. | 455/456.5 |
| 6,571,082 B1 * | 5/2003 | Rahman et al. | ............ | 455/67.11 |
| 6,792,080 B1 * | 9/2004 | Imperato et al. | ........... | 379/29.02 |
| 6,819,929 B2 * | 11/2004 | Antonucci et al. | ............ | 455/445 |
| 6,873,290 B2 | 3/2005 | Anderson et al. | | |
| 7,023,383 B2 | 4/2006 | Stilp et al. | | |
| 7,333,480 B1 * | 2/2008 | Clarke et al. | .................. | 370/352 |
| 7,420,963 B1 * | 9/2008 | Shankar et al. | ............... | 370/352 |
| 7,522,918 B2 * | 4/2009 | Wachter et al. | ............... | 455/423 |
| 2002/0147007 A1 * | 10/2002 | Hall et al. | ..................... | 455/423 |
| 2004/0017312 A1 | 1/2004 | Anderson et al. | | |
| 2004/0229620 A1 * | 11/2004 | Zhao et al. | ..................... | 455/445 |
| 2005/0024265 A1 | 2/2005 | Stilp et al. | | |
| 2005/0206566 A1 | 9/2005 | Stilp et al. | | |
| 2007/0093257 A1 | 4/2007 | McDougall et al. | | |
| 2007/0238448 A1 * | 10/2007 | Gallagher et al. | ......... | 455/414.2 |
| 2008/0113672 A1 * | 5/2008 | Karr et al. | .................. | 455/456.1 |
| 2008/0132197 A1 * | 6/2008 | Koepke | ..................... | 455/404.2 |

* cited by examiner

*Primary Examiner* — Binh K Tieu

(57) ABSTRACT

A method (38) and system (56) evaluate the accuracy of an Automatic Location Identification (ALI) system (36) deployed within an environment (20) and configured to location a wireless communication device (24) originating an emergency call (22) through a wireless communication network (26). The method (38) includes a subprocesses that identify a validation region (144) in which a service area (106) of a public service answering point (PSAP) (32) and an RF coverage area (129) overlap, classify sub-regions within the validation region (144) according to a predetermined set of test scenarios (148) representing unique calling environments, and select test points (200) within the validation region (144) from which test calls, that simulate emergency calls, will be performed. The method (38) further includes an empirical test call execution subprocess (50) for performing test calls within the validation region (144) and a predictive test call execution subprocess (52) for simulating test calls within a simulated environment (260).

20 Claims, 17 Drawing Sheets

| REF.# (150) | ENVIRONMENT (152) TEST SCENARIO — 148 | CONDITION (154) |
|---|---|---|
| CLASS: RURAL — 156 | | |
| R-1 | FLAT LAND, CLEAR VIEW OF SKY | OUTDOOR, STATIONARY |
| R-2 | FLAT LAND, CLEAR VIEW OF SKY | INSIDE CAR, STATIONARY |
| R-3 | FLAT LAND, CLEAR VIEW OF SKY | INSIDE CAR, 30 MPH |
| R-11 | HILLY TERRAIN, CLEAR VIEW OF SKY | OUTDOOR, STATIONARY |
| R-12 | HILLY TERRAIN, CLEAR VIEW OF SKY | INSIDE CAR, STATIONARY |
| R-13 | HILLY TERRAIN, CLEAR VIEW OF SKY | INSIDE CAR, 30 MPH |
| CLASS: SUBURBAN — 156 | | |
| S-1 | RESIDENTIAL SIDEWALK | OUTDOOR, STATIONARY |
| S-2 | RESIDENTIAL SIDEWALK | OUTDOOR, WALKING |
| S-14 | SHOPPING PLAZAS | OUTDOOR, STATIONARY |
| S-15 | SHOPPING PLAZAS | INDOOR, STATIONARY |
| CLASS: URBAN — 156 | | |
| U-1 | URBAN CANYON - HIGH, INTERSECTION | OUTDOOR, STATIONARY |
| U-2 | URBAN CANYON - HIGH, MID-BLOCK | OUTDOOR, WALKING |
| U-29 | URBAN - RESIDENTIAL, SIDEWALK | OUTDOOR, WALKING |
| CLASS: HIGHWAY — 156 | | |
| H-1 | HIGHWAY | INSIDE CAR, HEAVY TRAFFIC |
| H-2 | HIGHWAY | INSIDE CAR, 30-40 MPH |
| CLASS: WATER — 156 | | |
| W-1 | BOAT, WITHIN 2 MILES FROM SHORE | STATIONARY |
| W-2 | BOAT, WITHIN 2 MILES FROM SHORE | 5-20 KNOTS |

FIG.11    72

| SUB-REGION IDENTIFIER | LOCATION DESCRIPTION | TEST SCENARIO |
|---|---|---|
| A | 200 m NORTH OF RR 72 @ MILE MARKER 26 | R-11 |
| B | 100 m NORTH OF RR 72 @ MILE MARKER 26 | R-11 |
| C | NORTH SIDE OF RR 72 @ MILE MARKER 26 | R-12, R-13 |
| D | SOUTH SIDE OF RR 72 @ MILE MARKER 26 | R-12, R-13 |
| | | |
| | | |
| K | 123 A AVE, NW CORNER OF FASHION CENTER | S-14 |
| L | 123 A AVE, FASHION CENTER FOOD COURT | S-15 |
| M | 123 A AVE, FASHION CENTER INNER CORRIDOR | S-15 |
| | | |
| . | . | . |
| . | . | . |
| X | | U-2 |
| Y | | U-1 |
| Z | | U-2 |
| AA | | U-1 |
| AB | | U-2 |
| . | | . |

FIG. 13

| REF. #<br>A=BUSY HR<br>B=OFF PEAK<br>C=NIGHT | TRIAL # | GROUND TRUTH | | GEOLOCATION ESTIMATE (REPORTED LOCATION) | | | TIME CALL ORIG | TIME REPORTED LOCATION SENT FROM ALI SYSTEM |
|---|---|---|---|---|---|---|---|---|
| | | LAT | LONG | LAT | LONG | TIME OF EST. | X | Y |
| S-14A | 1 | GT1 | GT2 | RL1 | RL2 | $T1_E$ | $T1_O$ | $T1_S$ |
| S-14A | 2 | | | | | | | |
| ... | ... | | | | | | | |
| S-14A | 39 | | | | | | | |
| S-14A | 40 | | | | | | | |
| S-14B | 1 | | | | | | | |
| S-14B | 2 | | | | | | | |
| ... | ... | | | | | | | |
| S-14B | 39 | | | | | | | |
| S-14B | 40 | | | | | | | |
| S-14C | 1 | | | | | | | |
| S-14C | 2 | | | | | | | |
| ... | ... | | | | | | | |
| S-14C | 39 | | | | | | | |
| S-14C | 40 | | | | | | | |
| ... | ... | | | | | | | |
| R-13A | 1 | GT3a | GT4a | RL5a | RL5a | $T2a_E$ | $T2a_O$ | $T2a_S$ |
| R-13A | 1 | GT3b | GT4b | RL5b | RL5b | $T2b_E$ | $T2a_O$ | $T2b_S$ |
| R-13A | 1 | GT3c | GT4c | RL5c | RL5c | $T2c_E$ | $T2a_O$ | $T2c_S$ |
| R-13A | 2 | | | | | | | |
| ... | ... | | | | | | | |
| R-13A | 39 | | | | | | | |
| R-13A | 40 | | | | | | | |
| R-13B | 1 | | | | | | | |
| R-13B | 2 | | | | | | | |
| ... | ... | | | | | | | |

FIG. 16

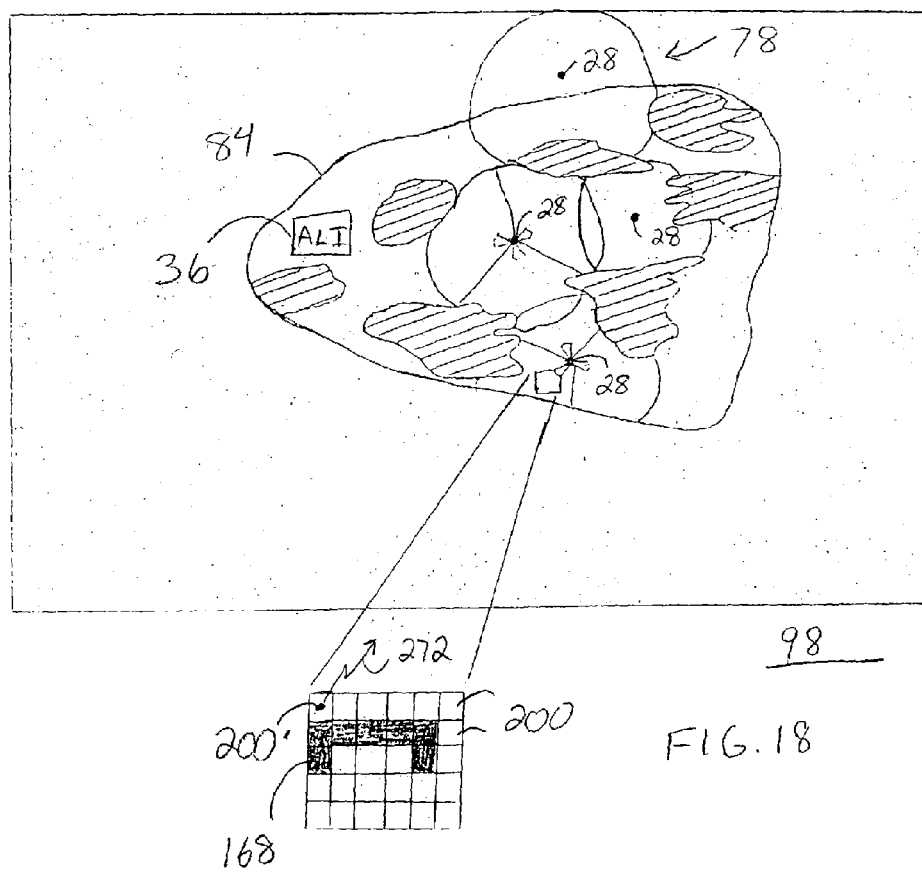

SYSTEM AND METHOD FOR EVALUATING ACCURACY OF AN AUTOMATIC LOCATION IDENTIFICATION SYSTEM

CROSS REFERENCE TO RELATED CASES

The present application is a continuation of U.S. patent application Ser. No. 10/603,131 filed on Jun. 24, 2003, the contents of which are hereby incorporated by reference.

TECHNICAL FIELD OF THE INVENTION

The present invention relates to the field of wireless communication networks. More specifically, the present invention relates to evaluating the accuracy of automatic location identification systems used to locate wireless communication devices originating emergency calls.

BACKGROUND OF THE INVENTION

Today's society is highly mobile. That is, individuals can move rapidly from one location to the next by utilizing automobiles, mass transit, bicycles, and the like. The advantages of communication any time and almost anywhere, advances in technology, and the affordability of wireless communication devices, such as cell phones, pagers, personal communications systems (PCS), and personal digital assistants (PDA) have resulted in a proliferation of these wireless communication devices in this mobile society.

Concurrent with the proliferation of wireless communication devices is the increased frequency of emergency calls originated from the wireless communication devices. These emergency calls are also referred to herein as 911 calls, representing the emergency services number "911" utilized in the United States. The ability to place 911 calls from wireless devices has contributed greatly to improving public safety, and is an important resource for individuals who need help desperately, but could not previously communicate that need. Unfortunately, many mobile callers dialing 911 to report an emergency do not know exactly where they are. This lack of spatial consciousness means operators at public safety answering points (PSAPs) may not be able determine a caller's location so that emergency response personnel can be quickly and accurately dispatched to the appropriate location.

In 1996, the Federal Communications Commission (FCC) issued a Report and Order requiring all wireless carriers and cell phone manufacturers to provide the capability for automatically identifying to emergency dispatchers the location from which a wireless call is being made. The FCC's wireless 911 mandate seeks to both improve the reliability of wireless 911 services and to provide enhanced features generally available for wireline calls.

Timing for implementing the 911 call requirements is divided into two phases. Phase I requires wireless carriers to deliver to the emergency dispatcher the telephone number of a wireless handset originating a 911 call, as well as the location of the cell site or base station receiving the 911 call, which provides a rough indication of the caller's location. This phase was implemented by the end of 1998. Phase II requires carriers to deliver more specific latitude and longitude location information, known as Automatic Location Identification (ALI), to the dispatcher in response to a 911 call initiated by a wireless device.

Various location determination technologies (LDT) are being developed to locate wireless communication devices in response to the FCC 911 Phase II mandate. These technologies encompass both network-based and handset-based equipment and processes. Broadly defined, a network-based technology is one in which the wireless communication network detects the signal transmitted from a wireless communication device and uses that signal to determine the current location of the wireless device. A hand-set based technology is one in which the wireless communication device detects signals transmitted from multiple base stations and/or satellites and uses those signals to determine the current location of the wireless device. In addition, hybrid techniques make use of both network-based and handset-based technologies to produce a more robust estimate of current location in a single process.

The FCC has adopted accuracy and reliability requirements for ALI as part of the Phase II mandate. The rules for network-based technologies specify accuracy and reliability requirements of one hundred meters for sixty-seven percent of emergency calls and three hundred meters for ninety-five percent of emergency calls. The rules for handset-based technologies specify accuracy and reliability requirements of fifty meters for sixty-seven percent of emergency calls and one hundred and fifty meters for ninety-five percent of emergency calls.

The deployment of an ALI system, and in particular, one used to provide 911 call Phase II compliant services, needs to be validated with a comprehensive test of all the environments that exist in thousands of service areas, each covering hundreds of square miles, to determine whether the ALI system complies with the accuracy standards set by the FCC. The FCC further recommends a biannual post-deployment validation of the accuracy of the ALI system. Unfortunately, a comprehensive validation of an ALI system using current empirical observations is both costly and time consuming, and requires a wireless carrier to hire a large staff of both highly skilled and medium to low skilled personnel. Furthermore, a comprehensive validation of an ALI system calls for a large number of repetitive tasks and significant human intervention, which increases the probability of error.

SUMMARY OF THE INVENTION

Accordingly, it is an advantage of the present invention that a method and system are provided for evaluating the accuracy of an automatic location identification system (ALI).

It is another advantage of the present invention that the method and system evaluate an ALI system based on FCC accuracy and reliability requirements.

It is another advantage of the present invention that the method and system minimize error and costs by effectively utilizing automated tools for repetitive tasks.

Another advantage of the present invention is that the method and system enable completion of comprehensive validations in a timely manner with minimum need for specialized staff.

Yet another advantage of the present invention is that the method and system are operable independent from the particular ALI technology deployed.

The above and other advantages of the present invention are carried out in one form by a method for evaluating accuracy of an automatic location identification (ALI) system configured to locate a wireless communication device originating an emergency call through a wireless communication network. The method calls for identifying a validation region in which a service area of a public safety answering point (PSAP) and a radio frequency (RF) coverage area of the wireless communication network overlap. A test scenario is selected that represents a calling environment in which the emergency call may occur, and a test point is chosen in the validation region exhibiting the calling environment represented by the test scenario. The method further calls for determining a ground truth of the test point and performing a test call from the test point, the test call simulating the emergency call. A reported location of the test point is obtained from the ALI system in response to the performing operation, and the reported location is compared with the ground truth to determine the accuracy of the ALI system in response to predetermined accuracy parameters.

The above and other advantages of the present invention are carried out in another form by a computing system for selecting test points in a validation region. The test points are used to validate accuracy of an automatic location identification (ALI) system operating in the validation region, and the ALI system is configured to locate a wireless communication device originating an emergency call through a wireless communication network. The computing system includes a processor, a computer-readable storage medium, and executable code recorded on the computer-readable storage medium for instructing the processor to select the test points. The executable code includes a validation region map subprocess for forming a validation region map of the validation region. The validation region map represents an overlap of a service area of a public safety answering point (PSAP) and a radio frequency (RF) coverage area of the wireless communication network. The executable code further includes a sub-region classification subprocess for partitioning the validation region map into a plurality of sub-regions and correlating each of the sub-regions with one of a plurality of test scenarios, each of the test scenarios representing a unique calling environment in which the emergency call may occur. A test point selection subprocess of the executable code chooses the test points in response to a selected one of the test scenarios, the test points exhibiting the unique calling environment represented by the selected one of the test scenarios.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 11 shows a table of a partial listing of a test scenario database that includes exemplary test scenarios in which the performance of an automatic location identification system 36 deployed in the environment of FIG. 1 may be evaluated;

FIG. 13 shows a table of a partial listing of a sub-region classification database that includes sub-regions within the populated validation region map of FIG. 12 correlated with the test scenarios of FIG. 11;

FIG. 16 shows an diagram of a call record database that includes a plurality of call records produced through the execution of empirical test call execution subprocess of FIG. 15;

FIG. 18 shows a diagram of a simulated environment formed through the implementation of the predictive test call execution subprocess of FIG. 17.

DETAILED DESCRIPTION OF THE PREFERRED EMBODIMENTS

Figure 1:
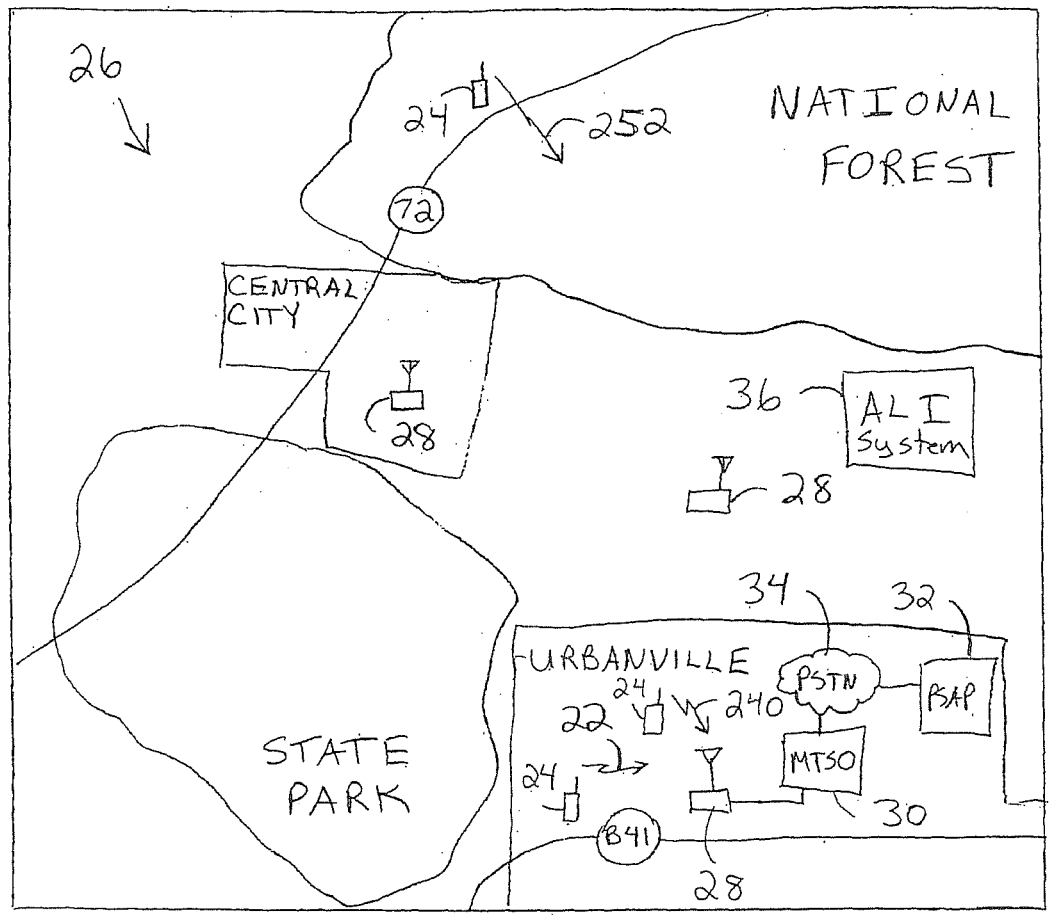
FIG. 1 shows a simplified diagram of an environment in which an emergency call, originated from a wireless communication device through a wireless communication network, may take place.

FIG. 1 shows a simplified diagram of an environment 20 in which an emergency call 22, originated from a wireless communication device 24 through a wireless communication network 26, may take place. Environment 20 represents a geographical region that may include a number of geographical and man-made features. Geographical features include, for example, hilly terrain, heavy foliage, mountains, flat land, water, and so forth. Man-made features include, for example, buildings, roads, bridges, and so forth. In the United States, emergency call 22 may be originated by dialing "911" from either a wireline telephone (not shown) or wireless communication device 24. However, emergency call 22 is not limited to the "911" digits utilized in the United States, but may encompass any digits utilized as an emergency services number in other regions or countries.

Wireless communication device 24 engages in wireless communication through one of base stations 28 of wireless communication network 26 by techniques known to those skilled in the art. Per convention, when wireless device 24 participates in a wireless phone call, such as emergency call 22, a channel connection is established between wireless communication device 24 and one of base stations 28 through a call center, such as a mobile telephone switching office (MTSO) 30. MTSO 30 then enables connection of emergency call 22 to a public safety answering point (PSAP) 32 via the public switched telephone network (PSTN) 34.

An automatic location identification (ALI) system, generally represented by a block 36, is deployed within environment 20 to locate wireless device 24 initiating emergency call 22. ALI system 36 may be a network-based technology, a handset-based technology, or a hybrid technology. The current location of wireless communication device 24, ascertained using ALI system 36, may be reported to PSAP 32.

A network-based technology may employ time difference of arrival (TDOA), angle of arrival (AOA), and/or location fingerprinting. TDOA calculates the current location of a wireless device based on the time at which the radio frequency signal reaches three or more nearby antennas usually co-located with base stations 28. AOA determines the direction of arrival of an RF communication signal emitted from wireless device 24. The phase difference of the RF communication signal on elements of a calibrated antenna array, usually co-located with base stations 28, provides a line of bearing to wireless communication device 24. The intersection of the lines of bearing of two or more antenna arrays establishes the current location. Location fingerprinting utilizes the distinct RF patterns (multipath phase and amplitude characteristics) of RF communication signals arriving at a receiver antenna from a single caller. The unique characteristics of the signal are analyzed and a "fingerprint" is determined for a defined area. By matching the fingerprint of the caller's signal with a database of known fingerprints, the caller's geographic location is identified to one of the surveyed areas.

A handset-based technology may employ wireless system signals, satellite signals, or a combination of wireless system and satellite signals. Wireless communication devices 24 that use wireless system signals transmitted by base stations serving wireless communication network 26, perform algorithms such as Advanced Forward Link Trilateration (AFLT) to determine current location. Wireless communication devices 24 that use satellite signals are furnished with a Global Positioning System (GPS) receiver and make use of signals received from multiple Global Positioning System (GPS) satellites to determine current location. The current location, ascertained using a handset-based technology, is then communicated through wireless communication network 26 to PSAP 32.

The network-based and handset-based location determination technologies described above are an exemplary representation of the possible techniques that may be utilized to implement ALI system 36 within environment 20. The present invention is not limited to the particular ALI system implemented within an environment. Rather, the present invention advantageously evaluates the accuracy of location estimates provided by any current and future automatic location identification (ALI) systems deployed within an environment. Furthermore, the ALI systems need not be limited to ALI systems that only locate wireless communication devices initiating emergency calls. Rather, the present invention may evaluate ALI systems adapted to locate wireless communication devices initiating any type of call.

Figure 2:
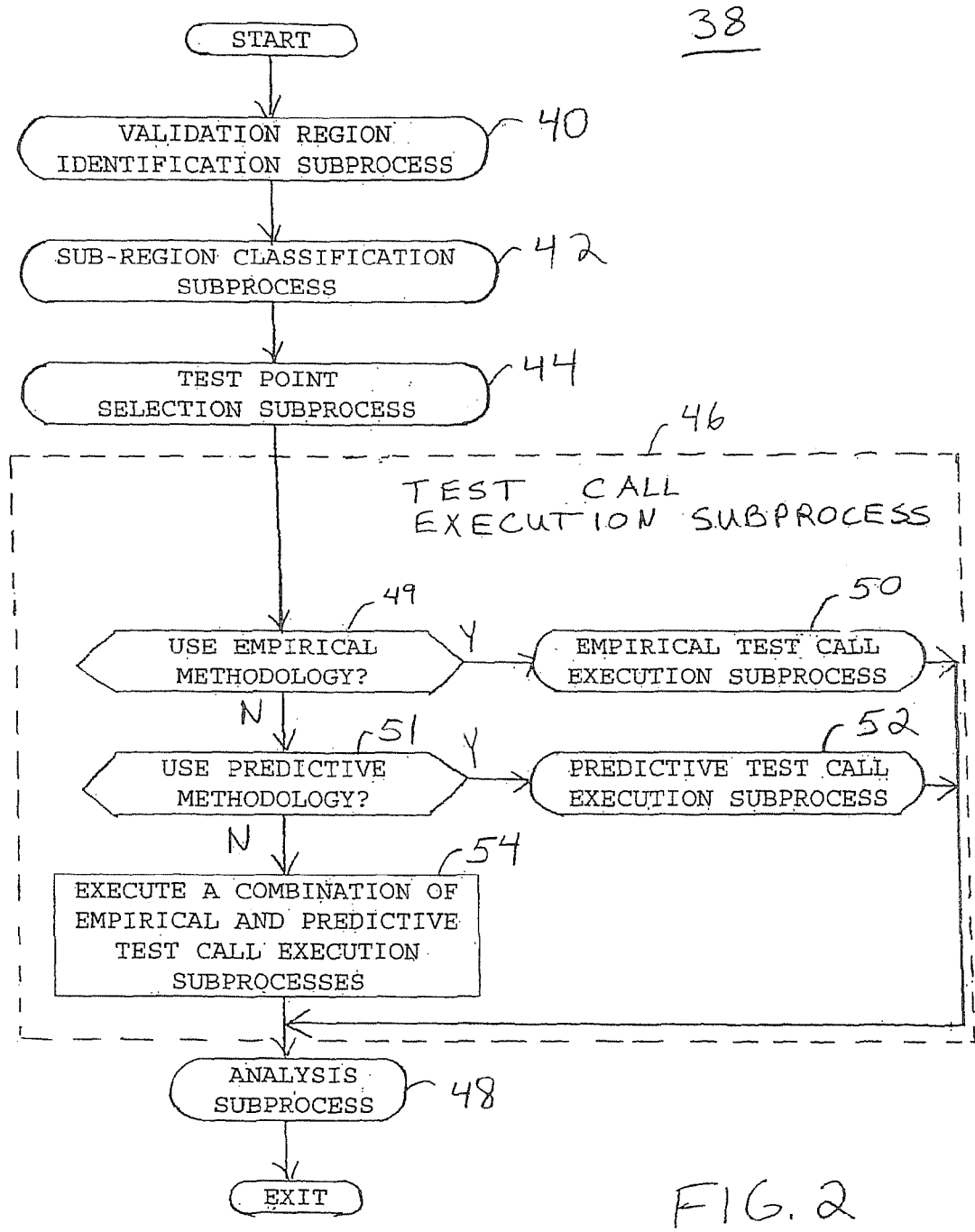
FIG. 2 shows a flow chart of an automatic location identification (ALI) evaluation process in accordance with the present invention.

FIG. 2 shows a flow chart of an automatic location identification (ALI) evaluation process 38 in accordance with the present invention. ALI evaluation process 38 may be initiated to evaluate the accuracy of ALI system 36 (FIG. 1) deployed within environment 20 (FIG. 1). ALI evaluation process 38 begins with the execution of a validation region identification subprocess 40, followed by the execution of a sub-region classification subprocess 42, which is then followed by a test point selection subprocess 44. Following test point selection subprocess 44, a test call execution subprocess 46, generally represented by dashed lines, is executed. After test call execution subprocess 46, ALI evaluation process 38 proceeds to the execution of an analysis subprocess 48. Following analysis subprocess 48, ALI evaluation subprocess 38 exits.

In a preferred embodiment, validation region identification subprocess 40, sub-region classification subprocess 42, and test point selection subprocess 44, and analysis subprocess 48 are largely carried out as automated processes utilizing a computing system, described below. Test call execution subprocess 46 may be carried out by utilizing an empirical methodology, a predictive methodology or a hybrid methodology. As such, test call execution subprocess 46 begins with a query task 49. At query task 49, a determination is made as to whether only empirical methodology is to be used. When only empirical methodology is to be used, test call execution subprocess 46 continues with the execution of an empirical test call execution subprocess 50. Following the execution of empirical test call execution subprocess 50, ALI evaluation process 38 proceeds to analysis subprocess 48. However, when there is a negative response to query task 49, test call execution subprocess 46 advances to a query task 51.

At query task 51, a determination is made as to whether only predictive methodology is to be used. When only predictive methodology is to be used, test call execution subprocess 46 continues with the execution of a predictive test call execution subprocess 52. Following the execution of predictive test call execution subprocess 52, ALI evaluation process 38 proceeds to analysis subprocess 48. However, when there is a negative response to query task 51, test call execution subprocess 46 advances to a task 54.

At task 54, a combination of empirical and predictive test call execution subprocesses 50 and 52, respectively, is executed (discussed below). Following task 54, ALI evaluation process 38 proceeds to analysis subprocess 48. For clarity of understanding, the subprocesses of ALI evaluation process 38 (i.e., validation region identification subprocess 40, sub-region classification subprocess 42, test point selection subprocess 44, empirical test call execution subprocess 50, predictive test call execution subprocess 52, and analysis subprocess 48) will be discussed separately hereinbelow.

Figure 3:
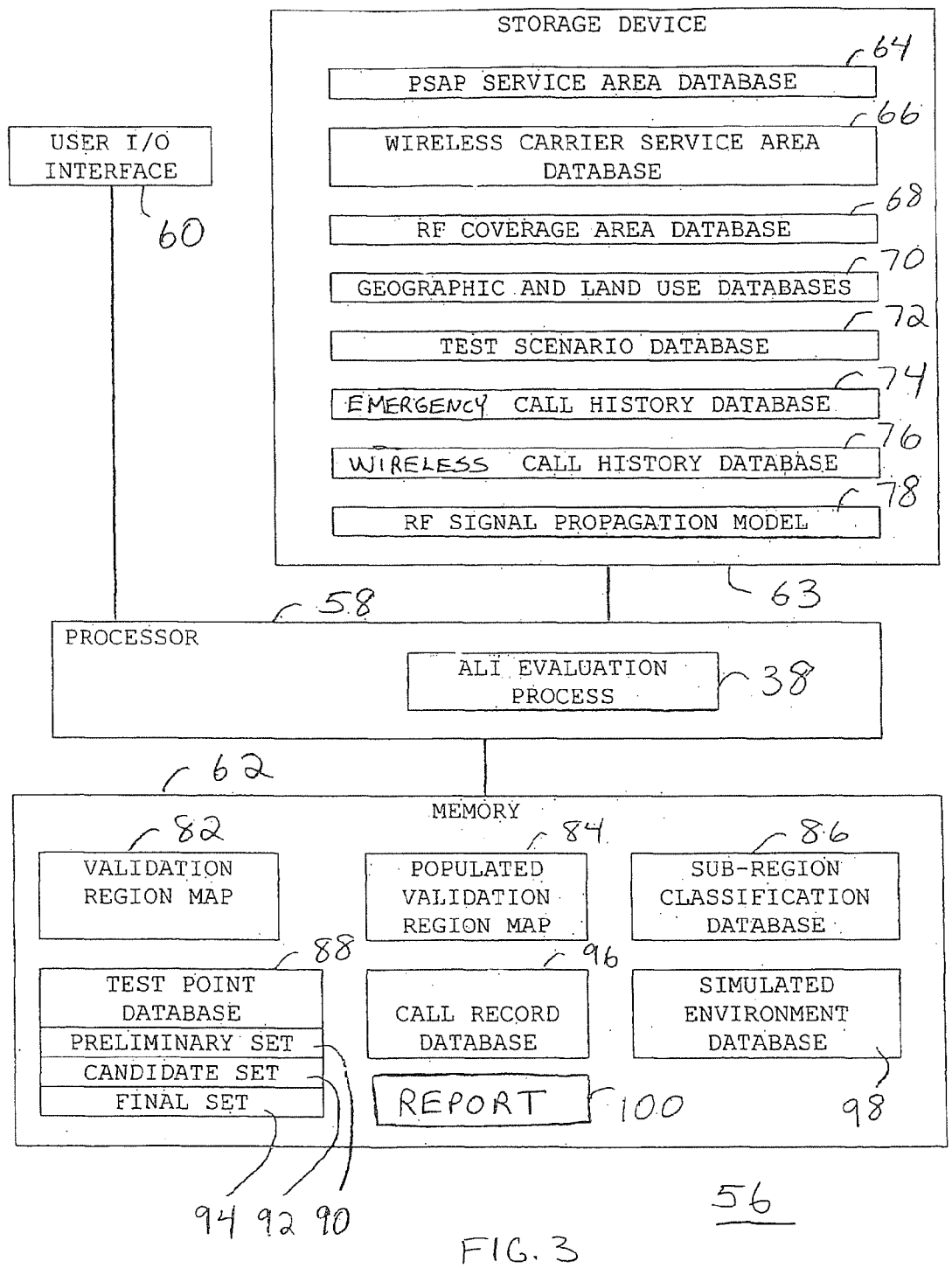
FIG. 3 shows a block diagram of a computing system through which the ALI evaluation process of FIG. 2 is executed.

FIG. 3 shows a block diagram of a computing system 56 through which ALI evaluation process 38 (FIG. 2) is executed. Computing system 56 includes a processor 58 on which the methods according to the invention can be practiced. Processor 58 is in communication with user I/O interface 60 and memory 62.

Processor 58 also includes a data reader (not shown) for reading data from a storage device 63. The data in storage device 63 includes, for example, a PSAP service area database 64, a wireless carrier service area database 66, an RF coverage area database 68, geographic and land use databases 70, a test scenario database 72, a emergency call history database 74, an wireless call history database 76, and an RF signal propagation model 78. The data reader may include a hard disk drive internal or external to processor 58, a tape drive, floppy disk drive, CD-ROM, or a combination thereof. Storage device 63 may be, but is not limited to, a compact disk, a personal computer memory card international association (PCMCIA) card, a floppy disk, a server or multiple servers accessible via the Internet, or a combination thereof.

An input portion of user I/O interface 60 may include, but is not limited to, input devices such as a keyboard, mouse, trackball, joystick, touch sensitive tablet or screen, or a combination thereof for entering data and commands into processor 58. Likewise, an output portion of user I/O interface 60 may include output devices utilizing any known means for displaying textual, graphical, or video images from processor 58. The components of computing system 56 discussed above may be implemented utilizing several known off-the-shelf components.

Processor 58 is capable of executing some or all of a number of software modules, for example, validation region identification subprocess 40, sub-region classification subprocess 42, test point selection subprocess 44, test call execution subprocess 46, and analysis subprocess 48. Memory 62 is an addressable storage medium, readable by processor 58, upon which information and executable code, such as ALI evaluation process 38, is stored.

In addition, memory 62 has stored therein a validation region map 82 generated during the execution of validation region identification subprocess 40 (FIG. 2), and a populated validation region map 84 and a sub-region classification database 86 generated during the execution of sub-region classification subprocess 42 (FIG. 2). In addition, memory 62 has stored therein a test point database 88 generated through the execution of test point selection subprocess 44 (FIG. 2). Test point database 88 may be subdivided into a preliminary set 90, a candidate set 92, and a final set 94 of test points (discussed below). Memory 62 further has stored therein a call record database 96 generated during the execution of test call execution subprocess 46 (FIG. 2), a simulated environment database 98 formed during the execution of predictive test call execution subprocess 52 (FIG. 2), and a report 100 created during the execution of analysis subprocess 48 (FIG. 2).

Although memory 62 is described as having all of the above elements stored therein, it should be understood that any of items 82, 84, 86, 88, 90, 92, 94, 96, 98, and 100 may only be temporarily stored in memory 62 until a subsequent operation or subprocess is executed, discussed below. In addition, although computing system 56 is described as performing all of subprocesses 40, 42, 44, 46, and 48 of ALI evaluation process 38, it should be readily understood that processor 58 may be utilized to execute some or all of the subprocesses that form ALI evaluation process 38 (FIG. 2). Alternatively, different portions of process 38 may be distributed over a plurality of computing systems. Other elements and processes may be implemented in conjunction with those described herein and additionally other processes referencing similar sequences of operations can be employed.

Figure 4:
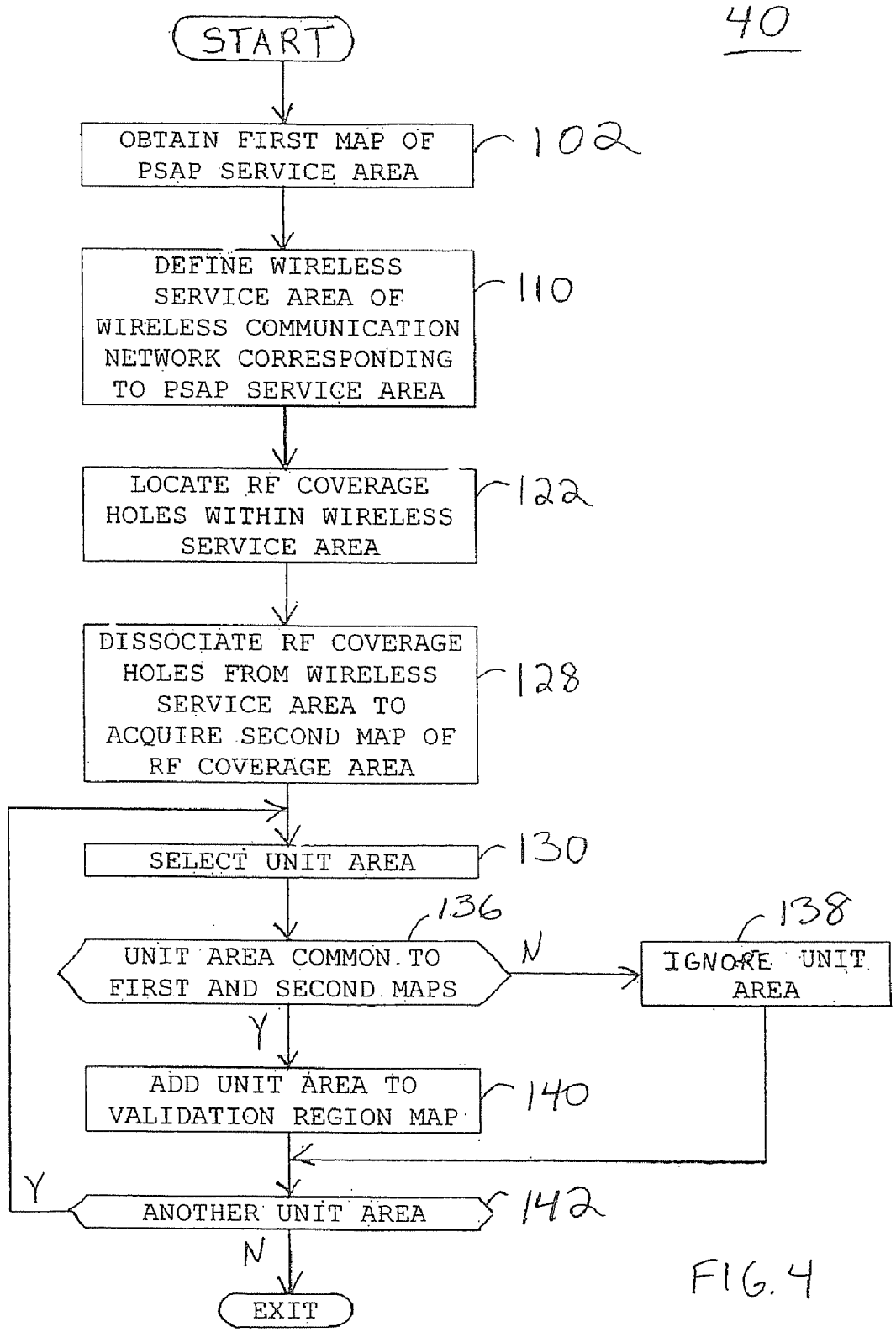
FIG. 4 shows a flow chart of a validation region identification subprocess of the ALI evaluation process of FIG. 2.

FIG. 4 shows a flow chart of validation region identification subprocess 40 of ALI evaluation process 38 (FIG. 1). Validation region identification subprocess 40 is executed to identify geographic boundaries of a region in environment 20 (FIG. 1) for which ALI system 36 (FIG. 1) is to be evaluated.

Subprocess 40 begins with a task 102. At task 102, processor 58 accesses PSAP service area database 64 (FIG. 1) to obtain a map of a PSAP service area for which ALI evaluation process 38 (FIG. 2) is to be performed. PSAP service area database 64 includes a list and boundary database of PSAPs. One such database 64 is, but is not limited to, MapInfo® PSAP Pro™ E9-1-1, provided by MapInfo Corporation, Troy, N.Y. MapInfo® PSAP Pro™E9-1-1 provides accurate boundaries based upon jurisdictional areas for PSAPs and telephone exchanges, and includes water bodies and unpopulated areas. Detailed information about each PSAP also includes the 10-digit emergency number. In addition, because rural areas and some suburbs have no PSAP, the MapInfo® PSAP Pro™ E9-1-1 database also includes information on the local sheriff or police departments who cover emergencies in these areas.

Figure 5:
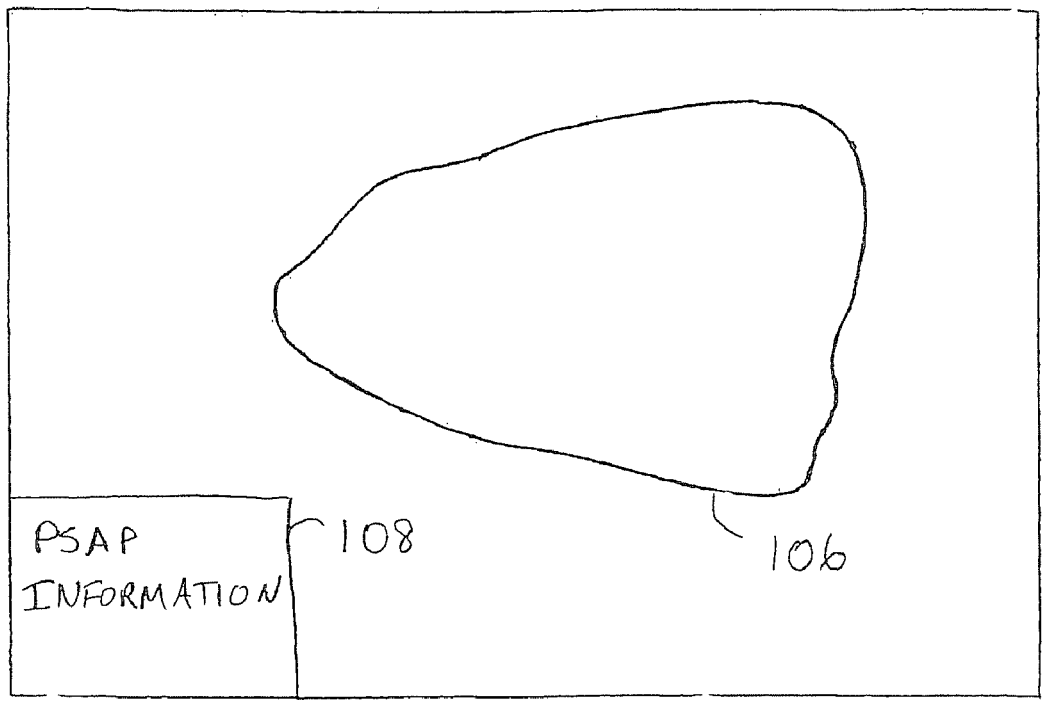
FIG. 5 shows a diagram of a service area map of a public safety answering point (PSAP)

Referring to FIG. 5 in connection with task 102, FIG. 5 shows a diagram of a service area map 104 of PSAP 32 (FIG. 1). Service area map 104 delineates a geographic boundary of a service area 106 of PSAP 32. Although not shown herein for simplicity, service area map 104 may also include county, or city boundaries, with clearly identified landmarks (i.e., streets, roads, highways, bodies of water, building landmarks, and so forth). Service area map 104 further includes PSAP information 108 that identifies PSAP 32. PSAP information 108 may include, but is not limited to, the agency name of PSAP 32, the administrative phone number, mailing address, address of the PSAP site, 10-digit emergency number, latitude and longitude of PSAP 32, and so forth.

Referring back to validation region identification subprocess 40 (FIG. 4), following task 102, a task 110 is performed. At task 110, processor 58 (FIG. 3) defines a wireless service area of wireless communication network 26 (FIG. 1) corresponding to PSAP service area 106. More specifically, processor 58 accesses wireless carrier service area database 66 (FIG. 3) to acquire a map of a wireless service area that approximately overlaps PSAP service area 106 (FIG. 5). Wireless carrier service area database 66 generally includes a list and boundary database of regions or markets of wireless communication network 26, and may be maintained by the service provider of wireless communication network 26 (FIG. 1).

Figure 6:
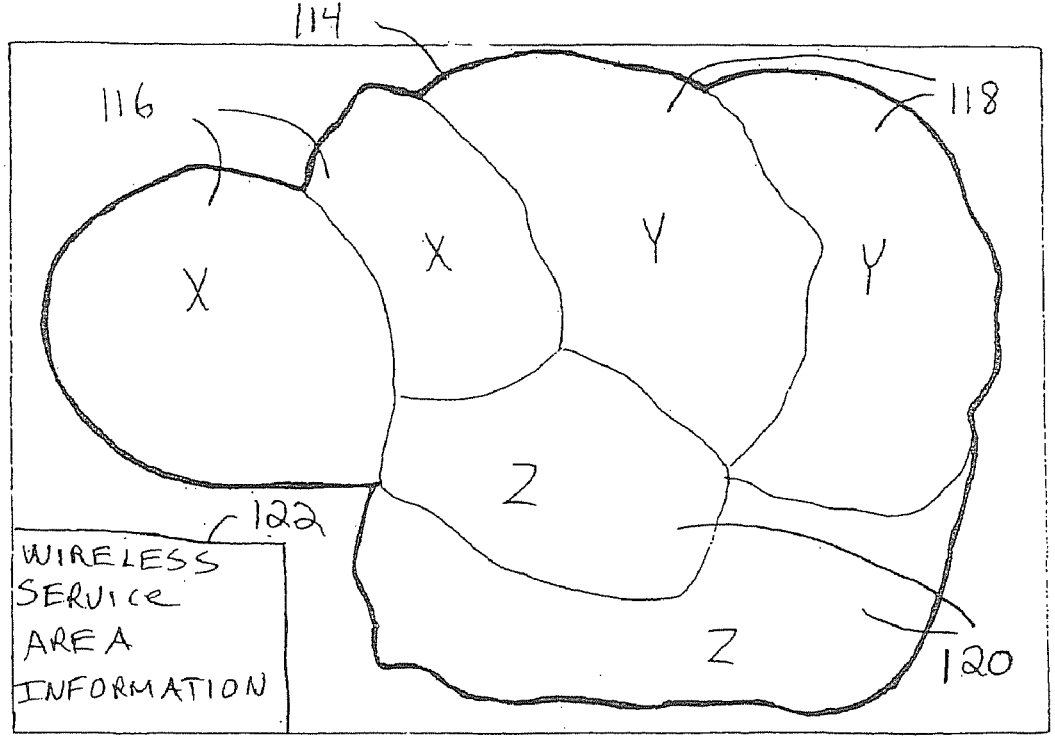
FIG. 6 shows a diagram of a wireless service area map of the wireless communication network approximately corresponding to the PSAP service area map of FIG. 5.

Referring to FIG. 6 in connection with task 110, FIG. 6 shows a diagram of a wireless service area map 112 of wireless communication network 26 approximately corresponding to PSAP service area 106 (FIG. 5). Wireless service area map 112 delineates a geographic boundary of a wireless service area 114, depicted by a dark perimeter border, of wireless communication network 26. In other words, wireless service area map 112 illustrates a geographical reach of a wireless communication network 26.

Wireless service area 114 may include two or more regions or markets of network 26. By way of illustration, wireless service area 114 may include a first market/region "X" 116, a second market/region "Y" 118, and a third market/region "Z/" 120. Wireless service area 114 may be based on metropolitan services areas (MSAs) and rural service areas (RSAs), each of which in turn may be based on county boundaries. Thus, an MSA or an RSA may include several counties. In contrast, PSAP service area 106 (FIG. 5) is not typically based on city or county boundaries. Wireless service area map 112 may also include wireless service area information 122 that identifies the market/regions, for example, first, second, and third market/regions 116, 118, and 120, depicted herein.

Referring back to validation region identification subprocess 40 (FIG. 4), following task 110, a task 122 is performed. At task 122, processor 58 (FIG. 3) locates RF coverage holes within wireless service area 114 (FIG. 6). More specifically, processor 58 accesses RF coverage area database 68 (FIG. 1) that identifies RF coverage holes within wireless service area 114. RF coverage area database 68 generally includes a list and boundary database of RF coverage holes within wireless communication network 26 (FIG. 1). RF coverage area database 68 may be generated by collating call history data for wireless service area 114, by taking field measurements of signal strength, and/or by utilizing a radio propagation tool to predict signal strength within wireless service area 114.

Figure 7:
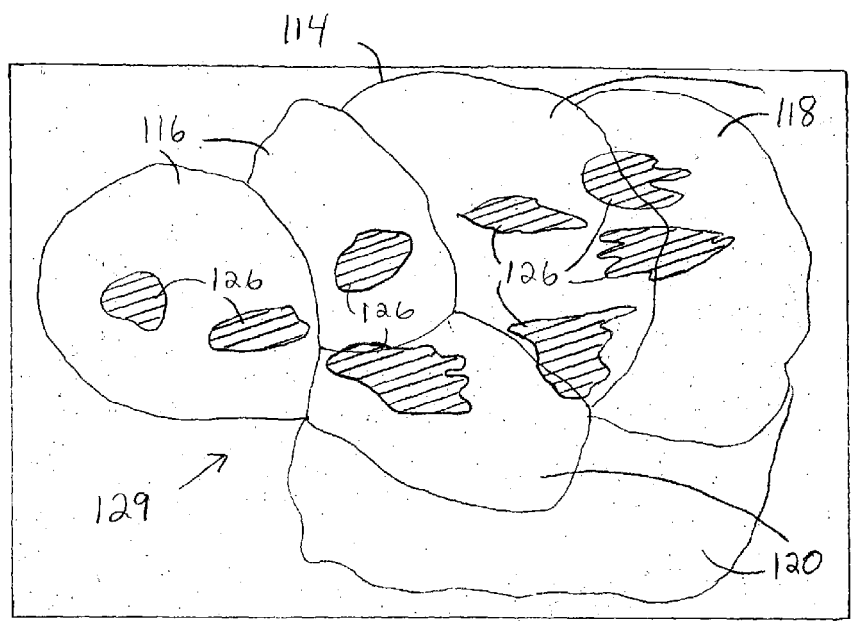
FIG. 7 shows a diagram of a radio frequency (RF) coverage area map of the wireless communication network.

Referring to FIG. 7 in connection with task 122, FIG. 7 shows a diagram of an exemplary radio frequency (RF) coverage area map 124 of wireless communication network 26 (FIG. 1). RF coverage area map 124 delineates a geographic boundary of RF coverage holes 126 within wireless service area 114. RF coverage holes 126 are those sub-areas located within wireless service area 114 of wireless communication network 26 (FIG. 1) in which the signal strength of RF communication signals is predicted to be below the design threshold. RF coverage holes are usually caused by physical obstructions such as buildings, foliage, hills, tunnels, indoor parking garages, and so forth.

The Federal Communication Commission (FCC) requires that a location determination of wireless communication device 24 (FIG. 1) originating emergency call 22 (FIG. 1) need only be found if emergency call 22 can be completed. Emergency call 22 is not likely to be completed in locations of RF coverage holes 126. As such, ALI evaluation process 38 need not be performed in the geographic regions delineated by RF coverage holes 126.

Referring back to validation region identification subprocess 40 (FIG. 4), in response to task 122, program control proceeds to a task 128. At task 128, processor 58 (FIG. 3) dissociates RF coverage holes 126 from wireless service area 114 (FIG. 6) to produce RF coverage area map 124 of an RF coverage area 129 (FIG. 7). This dissociation is graphically represented in RF coverage area map 124 by hash marks through RF coverage holes 126. Thus, the signal strength of RF communication signals within RF coverage area 129 is predicted to be greater than a predetermined design threshold set by the service provider of wireless communication network 26 (FIG. 1).

Following task 128, subprocess 40 proceeds to a task 130. At task 130, processor 58 (FIG. 3) selects a unit area for further assessment to determine whether the unit area is common to each of PSAP service area map 104 (FIG. 5) and RF coverage area map 124 (FIG. 7).

Figure 8:
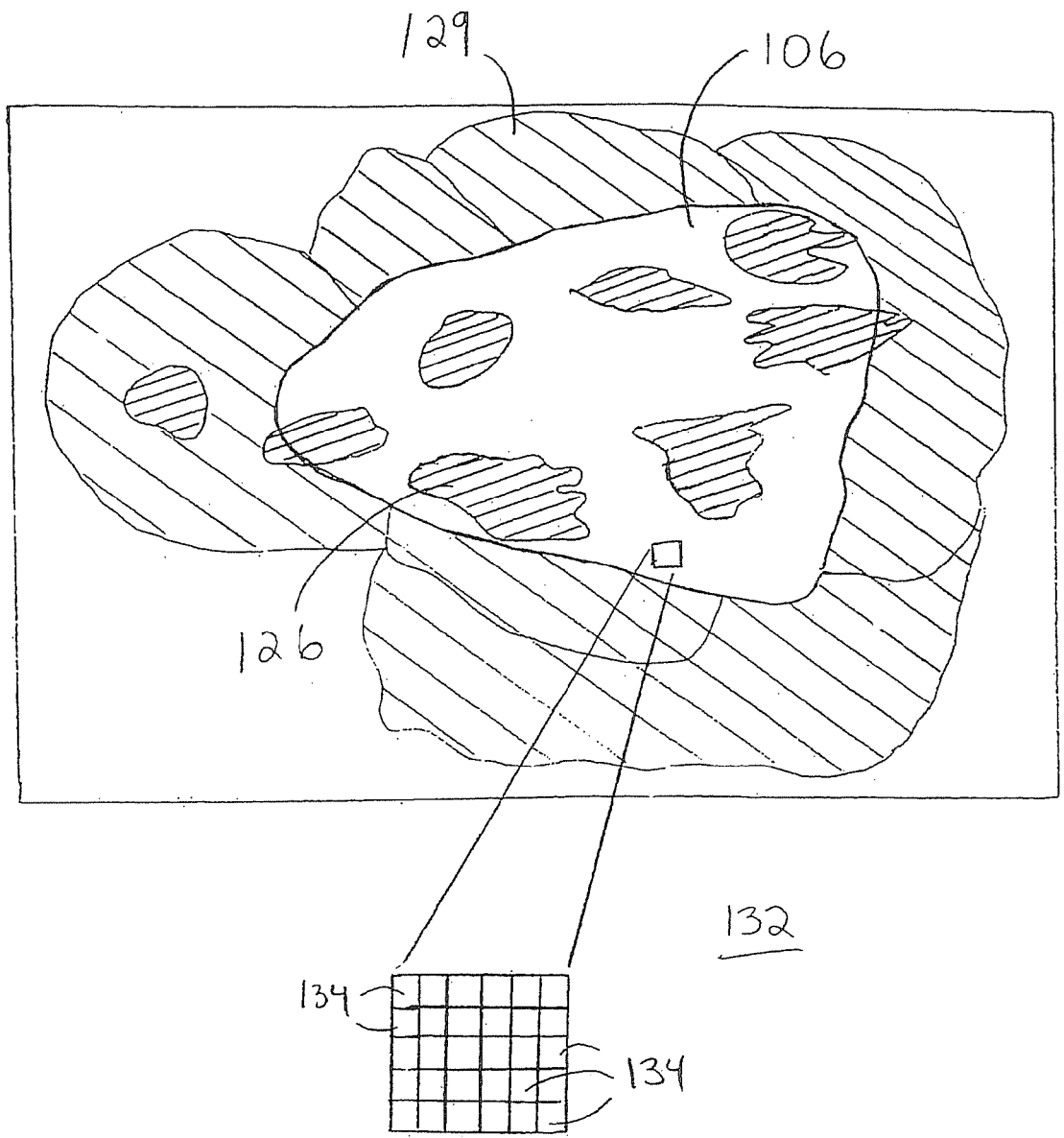
FIG. 8 shows a diagram of an overlay map that represents the PSAP service area of FIG. 5 overlaying the radio frequency (RF) coverage area of FIG. 7.

Referring to FIG. 8 in connection with task 130, FIG. 8 shows a diagram of an exemplary overlay map 132 that represents PSAP service area 106 (FIG. 5) overlaying RF coverage area 129 (FIG. 7). Overlay map 132 is subdivided into a plurality of exemplary unit areas 134, of which only a few are shown in an exploded view of overlay map 132. Unit areas 134 are the basic units that make up overlay map 132. Overlay map 132 simulates environment 20 (FIG. 1) in which emergency dispatch service, via PSAP 32 (FIG. 1), and wireless communication service, via wireless communication network 26 (FIG. 1), are provided. In a preferred embodiment, each of unit areas 134 may be, but is not limited to, the smallest area of interest, i.e., location, in environment 20. That is, the size of each of unit areas 134 may be selectable and adjustable to best accommodate the level of detail provided within overlay map 132.

PSAP service area database 64 (FIG. 3), wireless carrier service area database 66 (FIG. 3), and RF coverage area database 68 (FIG. 3) are configured as spatial databases. A spatial database contains geographical or "spatial" information in a prescribed format. For example, data entries of PSAP service area database 64 may include coordinates identifying each of unit areas 134 and spatial information relevant to the serving PSAP for the identified unit area 134. Similarly, data entries of wireless carrier service area database 66 may include the coordinates identifying each of unit areas 134 and spatial information relevant to the wireless service area of the service provider. Likewise, data entries of RF coverage area database 68 may include the coordinates identifying each of unit areas 134 and spatial information relevant to the signal strength of RF communication signals within the identified unit area 134. Accordingly, information pertaining to unit areas 134, i.e., spatially-referenced data, stored in each of databases 64, 66, and 68, may be referenced using spatial query techniques.

With regard to task 130 (FIG. 4) of process 40 (FIG. 4), one of unit areas 134 is selected. A query task 136 is performed in response to task 130. At query task 136, processor 56 (FIG. 3) executes a spatial query to determine whether the identified one of unit areas 134 is common to PSAP service area 106, represented by PSAP service area map 104 (FIG. 5), and RF coverage area 129, represented by RF coverage area map 124 (FIG. 7). Processor 56 accomplishes task 136 by querying each of PSAP service area database 64 (FIG. 3), wireless carrier service area database 66 (FIG. 3), and RF coverage area database 68 (FIG. 3).

When query task 136 determines that the identified one of unit areas 134 is not common to both PSAP service area 106 and RF coverage area 129, process 40 proceeds to a task 138. At task 138, the identified one of unit areas 134 is ignored. As such, the identified one of unit areas 134 is removed from further consideration. However, when query task 136 determines that the identified one of unit areas 134 is common to both PSAP service area 106 and RF coverage area 129, process 40 proceeds to a task 140.

At task 140, processor 58 (FIG. 3) adds the identified one of unit areas to a validation region map (discussed below). Following either of tasks 138 and 140, process 40 proceeds to a query task 142. At query task 142, processor 58 determines whether there is another one of unit areas 134 for which a determination is to be made as to whether it is common to both PSAP service area 106 and RF coverage area 129. When there is another one of unit areas 134, program control loops back to selection task 130 to select the next one of unit areas 134 (FIG. 8). However, when there are no more of unit areas 134, validation region identification subprocess 40 exits.

Figure 9:
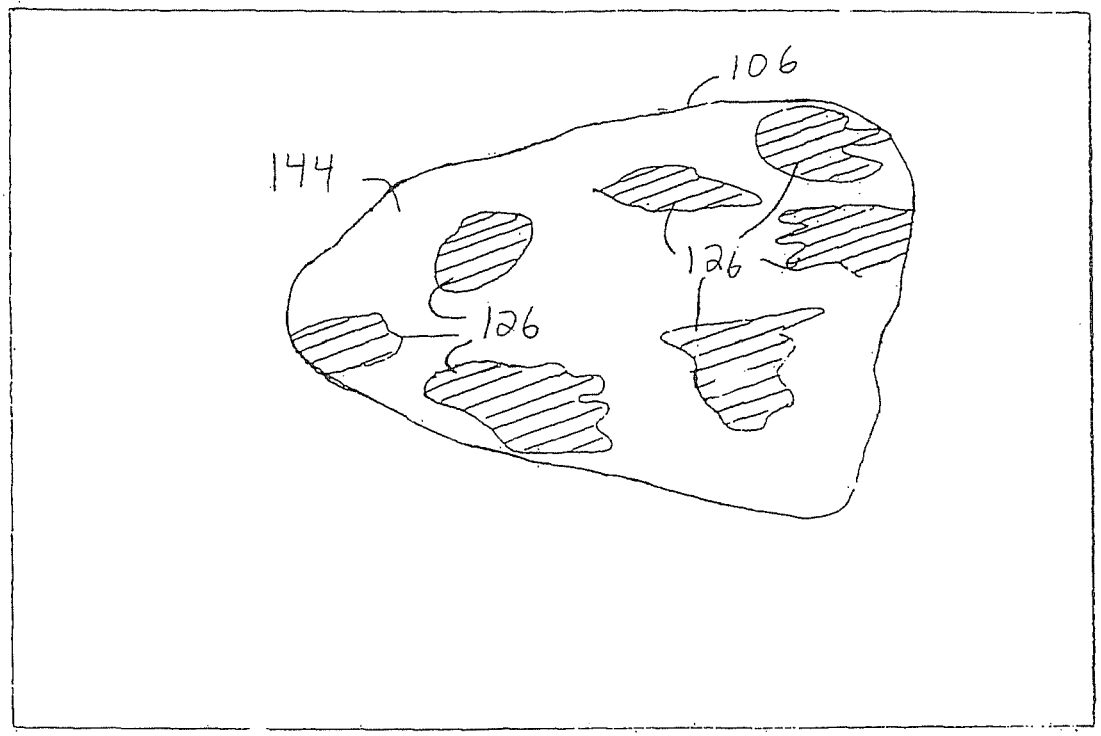
FIG. 9 shows a diagram of a validation region map compiled through the execution of the validation region identification subprocess of FIG. 4.

FIG. 9 shows a diagram of validation region map 82 compiled through the execution of validation region identification subprocess 40 (FIG. 4). Validation region map 82 represents a validation region 144 in environment 20 (FIG. 1) for which the deployed ALI system 36 (FIG. 1) may be evaluated. Validation region map 82 is bounded by the geographic boundary of PSAP service area 106 and excludes RF coverage holes 126 (represented by hash marks) located in wireless service area 114 (FIG. 7). Validation region map 82 is represented graphically for clarity of illustration. However, like databases 64, 66, and 68 (FIG. 3), validation region map 82 may be a spatial database containing a compilation of unit areas 134 that are common to both PSAP service area 106 and RF coverage area 129, and may be stored in memory 62 (FIG. 3).

With reference momentarily back to ALI evaluation process 38 (FIG. 2), following the execution of validation region identification subprocess (FIG. 4), resulting in the generation of validation region map 82 (FIG. 3), process 38 proceeds to sub-region classification subprocess 42.

Figure 10:
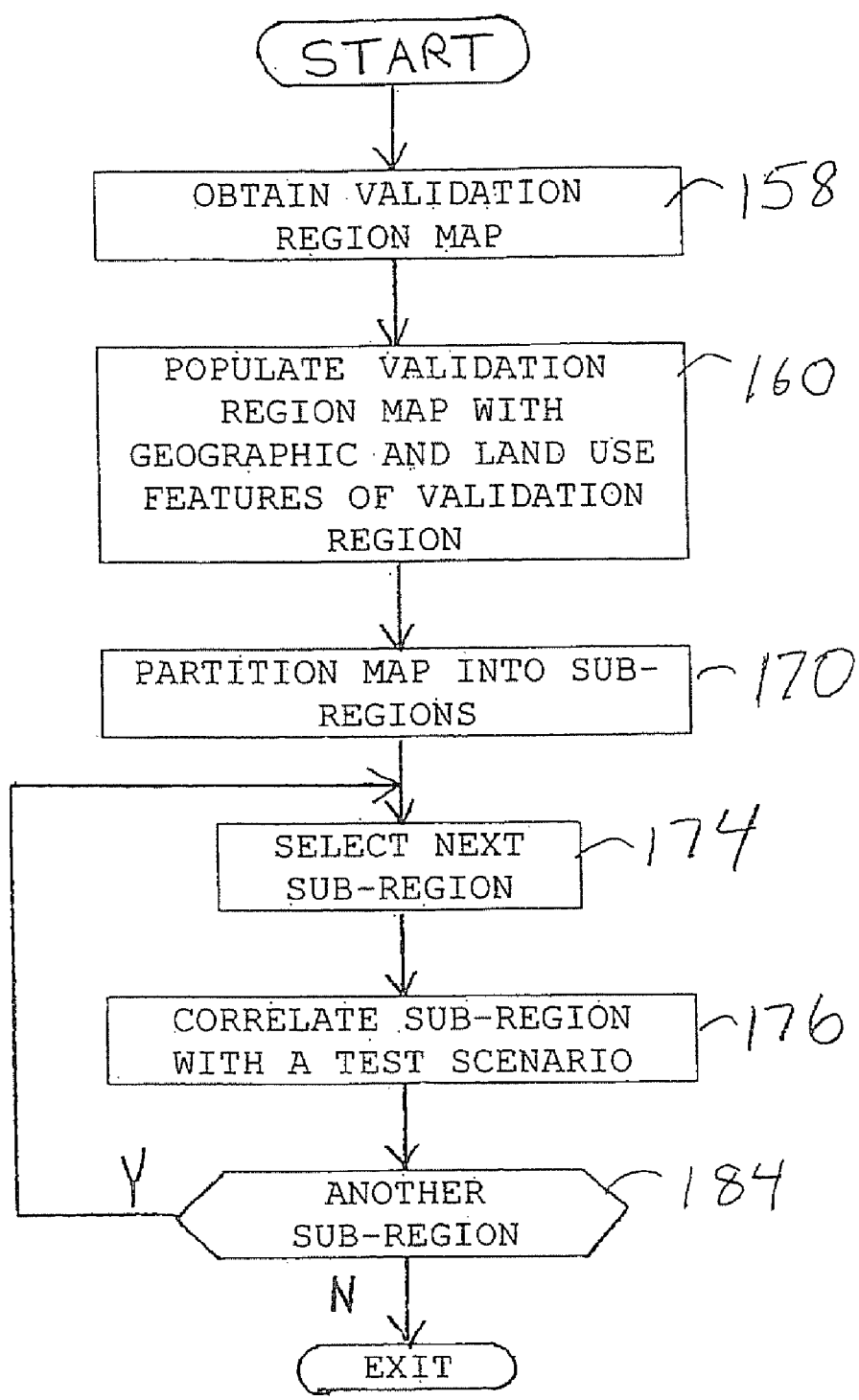
FIG. 10 shows a flow chart of a sub-region classification subprocess of the ALI evaluation process of FIG. 2.

FIG. 10 shows a flow chart of sub-region classification subprocess 42 of ALI evaluation process 38. Sub-region classification subprocess 42 is executed to classify sub-regions within validation region 144 (FIG. 9) that exhibit particular test scenarios, or environments, in which emergency calls 22 (FIG. 1) may occur.

Referring momentarily to FIG. 11, FIG. 11 shows a table of a partial listing of test scenario database 72 that includes exemplary test scenarios 148 in which the performance of ALI system 36 (FIG. 1) deployed in environment 20 (FIG. 1) may be evaluated. Wireless communication devices 24 (FIG. 1) operate in a wide range of environments and conditions. To characterize the performance of ALI system 36 under a realistic range of distinct service areas and environments, aspects such as the type of terrain, presence of natural and man-made structures, speed, location of wireless communication devices 24, and time of day are taken into account. Through the use of test scenarios 148, the range of typical operating conditions is condensed into a manageable number of test cases so that a comprehensive evaluation of ALI system 36 may be performed. Accordingly, test scenarios 148 represent unique calling environments within validation region 144 (FIG. 9).

Each of test scenarios 148, identified by a reference number 150, includes a combination of an environment 152 and a condition 154. Test scenarios 148 are subdivided into distinct classes 156. Classes 156 include rural, suburban, urban, highway, and water. Further distinction regarding type of terrain and foliage, indoor/outdoor location, types of man-made structures, and speed are made within each of classes 156.

In a preferred embodiment, the test scenario database 72 can be formed from a listing of test scenarios provided in the CDG Test Plan Document for Location Determination Technologies Evaluation, Section 5, © 2000 CDMA Development Group. The CDG Test Plan Document provides definitions and guidelines for test criteria and test scenarios for all possible location determination technologies (i.e. automatic location identification systems) used to meet the FCC E-911 Phase II requirements for locating wireless communication devices based on the TIA/EIA-95 and IS-2000 family of dual mode (analog and digital) standard in both the cellular and the personal communication system (PCS) communication bands. The present invention makes use of the listing of test scenarios in the CDG Test Plan for clarity and standardization of the evaluation of ALI systems. However, the test scenarios are not limited to those defined in the CDG Test Plan, but may encompass other present and future test scenario classification systems.

With reference back to FIG. 10, sub-region classification subprocess 42 begins with a task 158. At task 158, processor 58 (FIG. 3) accesses memory 62 (FIG. 3) to obtain validation region map 82 (FIG. 9) generated during the execution of validation region identification subprocess 40 (FIG. 4).

In response to task 158, a task 160 is performed. Task 160 causes processor 58 to populate validation region map 82 with the geographic and land use features of validation region 144 (FIG. 9). In particular, processor 58 accesses geographic and land use databases 70 (FIG. 3) from storage device 63 (FIG. 3), and using spatial query techniques, may merge information regarding the type of terrain and presence of natural and man-made structures.

Geographic and land use databases 70 encompass terrain elevation, land use land cover, and streets, highways, landmarks, and buildings databases provided, for example, by MapInfo® Corporation, Troy, N.Y. In addition, demographic information can be utilized to obtain information regarding population distribution within validation region 144. In an exemplary embodiment, the present invention may utilize the programming platform MapXtreme® produced by MapInfo® Corporation, Troy, N.Y. MapXtreme® is a Java-based Internet mapping server for broad deployment of spatial-analysis mapping applications. At task 160, geographic and land use databases 70 (FIG. 3) are queried, using spatial query techniques, to populate validation region map 82 (FIG. 9) with geographic and land use features of validation region 144.

Figure 12:
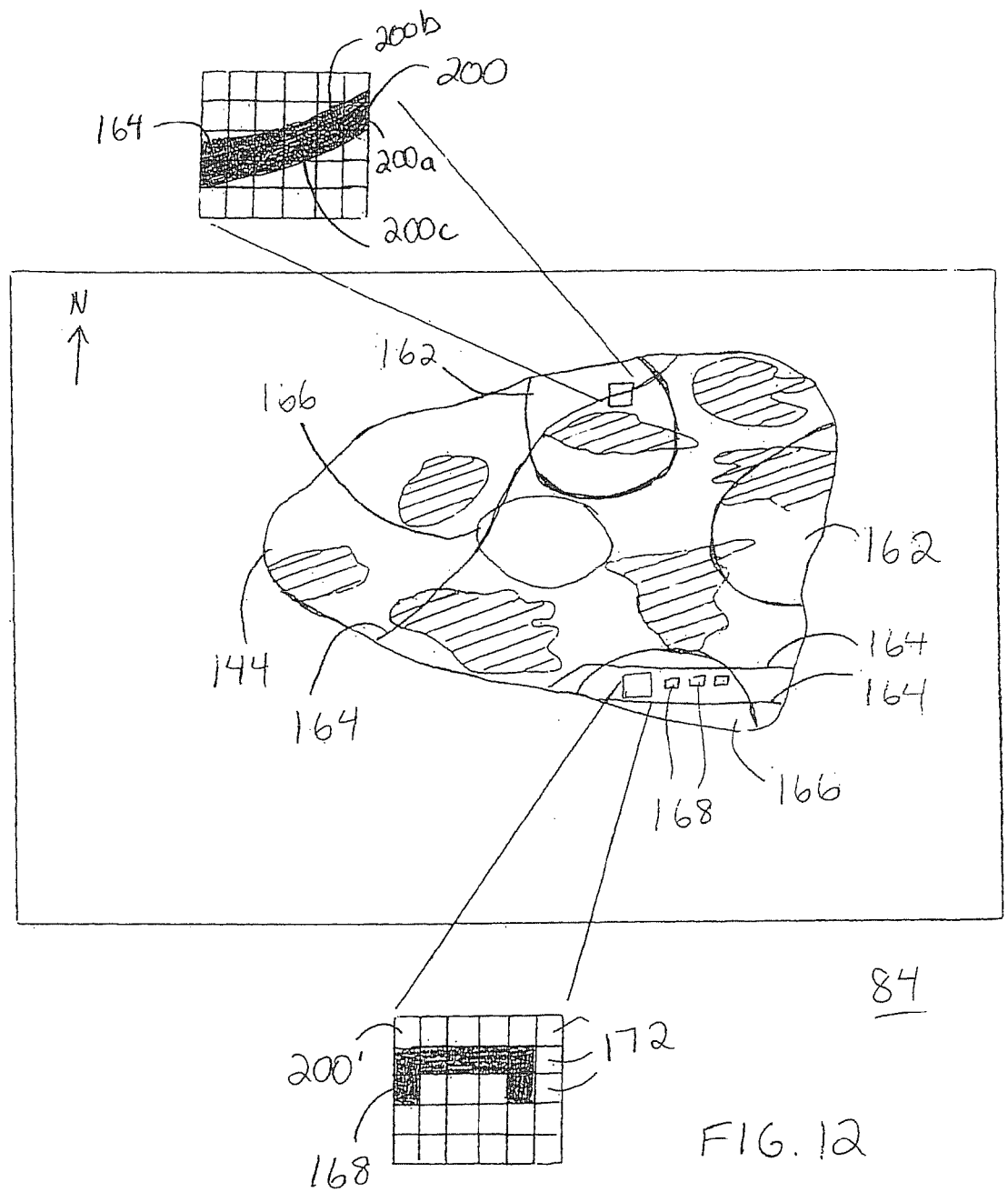
FIG. 12 shows a diagram of a populated validation region map.

FIG. 12 shows a diagram of populated validation region map 84 stored in memory 62 (FIG. 3) in response to the execution of task 160 of subprocess 42. Populated validation region map 84 is represented graphically for clarity of illustration. However, like validation region map 82 (FIG. 9), populated validation region map 84 may be a spatial database. Populated validation region map 84, in the form of a spatial database, is a compilation of validation region map 82 and geographic and land use databases 70.

Validation region map 84 is a highly simplified diagram of validation region 144 in which a number of geographical and man-made features are included. Some of the geographical and man-made features shown in populated validation region map 84 include, for example, rural, hilly, dense terrain areas 162, roads 164, suburban areas 166, buildings 168, and so forth. Those skilled in the art will recognize that the complexity of populated validation region map 84 is limited by the information contained within geographic and land use databases 70. Consequently, as databases 70 are updated with more detailed information, populated validation region map 84 can also be updated with the more detailed information.

Referring back to sub-region classification subprocess 42 (FIG. 10) and with continued reference to populated validation region map 84 (FIG. 12), following task 160, a task 170 is performed. At task 170, processor 58 (FIG. 3) partitions populated validation region map 84 into sub-regions 172. Sub-regions 172, of which only a few are shown in an exploded partial view of populated validation region map 84, are the basic units that make up populated validation region map 84. Each of sub-regions 172 relates to the smallest area of interest, i.e., location, in validation region 144 of environment 20 (FIG. 1). Thus, sub-regions 172 may be as small as ten square meters. Sub-regions 172 may be, but are not necessarily, related in size and location coordinates to unit areas 134 (FIG. 8).

Following task 170, a task 174 is performed to select a next one of sub-regions 172. Of course, during a first iteration of task 174, the "next" one of sub-regions 172, is a first sub-region 172.

In response to selection task 174, processor 58 (FIG. 3) correlates the selected one of sub-regions 172 with one of test scenarios 148 (FIG. 11). That is, processor 58 compares the environment and probable conditions of the selected one of sub-regions 172, determined through the execution of task 160, with environment 152 (FIG. 11) and condition 154 (FIG. 11) defined for each of test scenarios 148 in test scenario database 72 (FIG. 11). Processor 58 determines which of test scenarios 148 the selected one of sub-regions 172 most closely resembles and retains that information in sub-region classification database 86 (FIG. 3) stored in memory 62 (FIG. 3).

FIG. 13 shows an exemplary table of a partial listing of sub-region classification database 86 (FIG. 3) that includes sub-regions 172 (FIG. 12) within populated validation region map 84 (FIG. 12) correlated with particular test scenarios 148. Sub-region classification database 86 identifies each of sub-regions 172 by sub-region identifiers 180. Each of sub-region identifiers 180 is associated with a location description 182 and one or more test scenarios 148. Although location description 182 is shown in terms of instructions readily interpreted by an individual reading from database 86, it should be understood that location description 182 may be identified in terms of a latitude and longitude, or other coordinates that describe a geographic boundary of a particular one of sub-regions 172.

As further shown in sub-region classification database 86, sub-regions 172, identified by sub-region identifiers 180, may be correlated with more than one of test scenarios 148 from test scenario database 72 (FIG. 11). For example, sub-regions 172, identified by sub-region identifiers 180, labeled "C" and "D", are associated with two test scenarios 148, identified by reference numbers 150, labeled "R-12" and "R-13". Referring momentarily to test scenario database 72 (FIG. 11), test scenario 148 identified by reference number 150 of "R-12", defines an environment 152 of hilly terrain, clear view of sky and a condition 154 of inside car, stationary. Test scenario 148 identified by reference number 150 of "R-13", defines an environment 152 of hilly terrain, clear view of sky and a condition 154 of inside car, moving 30 miles per hour. Accordingly, although environment 152 is the same for each of "R-12" and "R-13" test scenarios 148, the "R-12" and "R-13" test scenarios 148 are both associated with "C" and "D" sub-regions identifiers 180, because each of the conditions 154 of "R-12" and "R-13" could occur in those sub-regions 172.

With reference back to sub-region classification subprocess 42 (FIG. 10), following task 176, a query task 184 is performed. At query task 184, processor 58 (FIG. 3) determines whether there is another one of sub-regions 172 with which one or more of test scenarios 148 is to be correlated. When there is another one of sub-regions 172, program control loops back to task 174 to select the next one of sub-regions 172 and correlate the selected one of sub-regions 172 with one or more test scenarios 148 (FIG. 11).

However, when processor 58 determines that there is not another of sub-regions 172, subprocess 42 exits. Thus, following the execution of subprocess 42 sub-region classification database 86, correlating sub-regions 172 of populated validation region map 84 (FIG. 12) with test scenarios 148, is generated.

As discussed in connection with ALI evaluation process 38 (FIG. 2), following the execution of sub-region classification subprocess 42 (FIG. 10), resulting in the generation of sub-region classification database 86 (FIG. 13), program control proceeds to test point selection subprocess 44 (FIG. 3).

Figure 14:
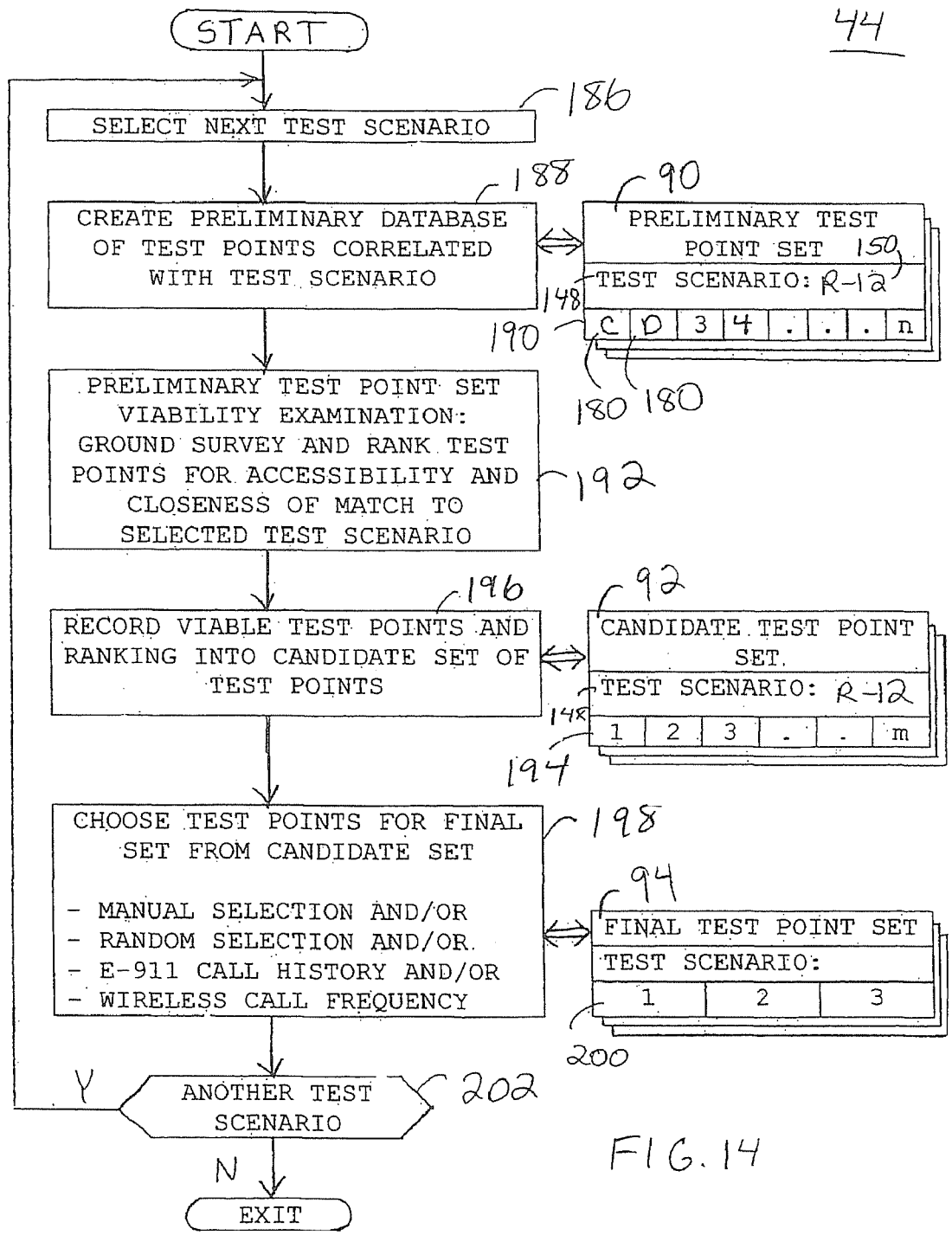
FIG. 14 shows a flow chart of a test point selection subprocess of the ALI evaluation process of FIG. 2.

FIG. 14 shows a flow chart of test point selection subprocess 44 of ALI evaluation process 38 (FIG. 2). Test point selection subprocess 44 is executed to choose test points within validation region 144 (FIG. 12), exhibiting calling environments represented by test scenarios 148 (FIG. 11), at which test calls (discussed below) may be performed to evaluate the accuracy of ALI system (FIG. 1).

Subprocess 44 begins with a task 186. At task 186, processor 58 (FIG. 3) selects a next one of test scenarios 148 (FIG. 11) from test scenario database. Of course, during a first iteration of task 186, the "next" one of test scenarios 148, is a first test scenario 148.

Following task 186, a task 188 is performed. At task 188, processor 58 (FIG. 3) creates a preliminary database, i.e. preliminary test point set 90, of preliminary test points 190 correlated with the selected one of test scenarios 148. More specifically, processor 58 accesses sub-region classification database 86 (FIG. 13) and identifies those sub-regions 172, identified by sub-region identifiers 180 (FIG. 13) that were associated with the selected one of test scenarios 148, identified by reference numbers 150 (FIG. 13). Accordingly, at task 188, preliminary test points 190 in the form of identified sub-regions 172 are retained in preliminary test point set 90.

By way of example, at task 186, a test scenario 148 identified by reference number 150, labeled "R-12" was selected. Accordingly, task 188 creates preliminary test point set 90 for reference number 150, labeled "R-12", of sub-regions 172 correlated with test scenario 148, "R-12", in sub-region classification database 86 (FIG. 13). Sub-regions 172 correlated with reference number 150 are labeled by sub-region identifiers 180 of "C" and "D".

Only two of sub-region identifiers 180 are shown in preliminary test point set 90 for simplicity of illustration. However, it should be apparent that there may be many more sub-regions 172 within validation region 144 that exhibit the selected one of test scenarios 148. Alternatively, there may be no sub-regions 172 within validation region 144 that exhibit the selected one of test scenarios 148. As such, preliminary test point set 90 for the selected one of test scenarios 148 may be a null set of preliminary test points 190.

Following task 188, a task 192 initiates a preliminary test point examination. More specifically, task 192 reviews each of preliminary test points 190 for the selected one of test scenarios 148 for accessibility and closeness of match to the selected one of test scenarios 148. Task 192 may be accomplished by performing a ground survey in which personnel may physically visit the locations within environment 20 (FIG. 1) represented by each of preliminary test points 190 to determine their practicality as a viable test point 194. A ground survey may weed out those preliminary test points 190 that are inappropriate due to database error, physical inaccessibility, and human factor issues. Alternatively, or in addition, processor 58 (FIG. 3) may rank preliminary test points 190 in accordance with their practicality as one of viable test points 194.

In response to task 192, a task 196 records viable test points 194 in candidate test point set 92 of test point database 88 (FIG. 3). Since viable test points 194 are selected from preliminary test point set 90 of preliminary test points 190, the number of viable test points 194 can be no greater than, and is likely less than, the number of preliminary test points 190 in set 90.

Following task 196, a task 198 chooses test points 200 from viable test points 194 of candidate test point set 92. Test points 200 identify those locations from which test calls (discussed below) will be placed upon initiation of test call execution subprocess 46 (discussed in further detail below). Task 198 encompasses a number of processes for choosing test points 200. These processes include a manual selection process, a random selection process, a selection process based on wireless emergency call history, a selection process based on wireless call frequency history, or a combination thereof.

Manual selection entails the ground survey discussed in connection with task 196 to determine viable test points 194. Task 198 subsequently entails determining how many of viable test points 194 for the selected one of test scenarios 148 will be tested based upon selection criteria, such as geographic dispersion of test points 200 within validation region 144 (FIG. 9), closeness of match to the selected one of test scenarios 148, and geometric dispersion of precision (GDOP) issues. Manual selection enables an individual to select a more localized test point, i.e., a specific location within a boundary of one of sub-regions 172 correlated with the selected one of test scenarios 148.

Automated random selection entails initiating a random selection process to choose test points 200 from viable test points 194 correlated with the selected one of test scenarios 148. For example, random selection process code assigns a number to each of viable test points 194, or to each of a sub-set of points within boundaries defined by each of viable test points 194. Random selection process code further includes a pseudorandom number generator to choose viable test points 194 to be test points 200.

A selection process based on wireless emergency call history entails accessing emergency call history database 74 (FIG. 3) within storage device 63 (FIG. 3). Emergency call history database 74 may include a combination of emergency calls made over all wireless communication networks maintained by multiple wireless service providers within validation region 144 (FIG. 9). The selection process based on emergency call history may then weight viable test points 194 according to the frequency of wireless emergency calls originated at those locations represented by viable test points 194. By weighting viable test points 194, more test points 200 are selected in sub-regions 172 exhibiting a greater frequency of wireless emergency calls.

A selection process based on wireless call frequency history is similar to a selection process based on emergency call history, with the exception that the selection process based on wireless call frequency history takes into account all calls carried out (emergency or otherwise) at those locations represented by viable test points 194.

Task 198 further entails recording test points 200 in final test point set 94 for storage in memory 62 (FIG. 3). Since test points 200 are selected from candidate test point set 92 of viable test points 194, the number of test points 200 may be no greater than, and is likely less than, the number of viable test points 194 in set 92. In particular, the CDG Test Plan Document specifies a predetermined number of locations, i.e., test points 200, to be tested per test scenario 148. Hence, the outcome of task 198 is to choose a number of locations, i.e., test points 200, from viable test point set 92 that is equivalent to this predetermined number of locations.

Following task 198, a query task 202 determines if there is another one of test scenarios 148 (FIG. 11) for which test points 200 are to be chosen. When there is another one of test scenarios 148, program control loops back to task 186. Alternatively, when query task 202 determines that there is not another one of test scenarios, test point selection subprocess 44 exits having generated final test point set 94 of test points 200 for each of test scenarios 148 representing unique calling environments within validation region 144 (FIG. 9).

Those skilled in the art will recognize that there is a great variation in task execution in test point selection subprocess 44. For example, tasks 188, 190, 198 may be combined or reordered according to the code development of test point selection subprocess 44 and the extensiveness of the ground survey of test points. Furthermore, test point database 88 (FIG. 3) need not have separate databases of preliminary test point set 90, candidate test point set 92, and final test point set 94. Instead, test point database 88 may include a single set of test points ranked according to viability, such that subsequent subprocesses selects test points from the single set of test points according to their ranking.

As discussed in connection with ALI evaluation process 38 (FIG. 2), following the execution of test point selection subprocess 44 (FIG. 14), resulting in the generation of final test point database 88 (FIG. 3) that includes test point set 94 of test points 200 (FIG. 14), program control proceeds to test call execution subprocess 46. Further as discussed, subprocess 46 may be executed using an empirical methodology, a predictive methodology, or a combination of empirical and predictive methodologies. The combination approach of task 54 (FIG. 2), for example, may utilize predictive test call execution subprocess 52 (FIG. 3) for test scenarios 148 (FIG. 11) in validation region 144 (FIG. 9) which lend themselves more easily to propagation modeling (flat terrain, light foliage, rural, etc.). Additionally, the combination approach of task 54 may utilize empirical test call execution 50 (FIG. 3) for test scenarios 148 for which propagation modeling may be more complex, such as urban areas, mountains, canyons, heavy foliage, etc.). Furthermore, empirical test call execution subprocess 50 may be performed in conjunction with predictive test call execution subprocess 52 at task 54 to validate the results obtained through predictive subprocess 52. For clarity, each of empirical and predictive test call execution subprocesses 50 and 52 are described hereinbelow.

Figure 15:
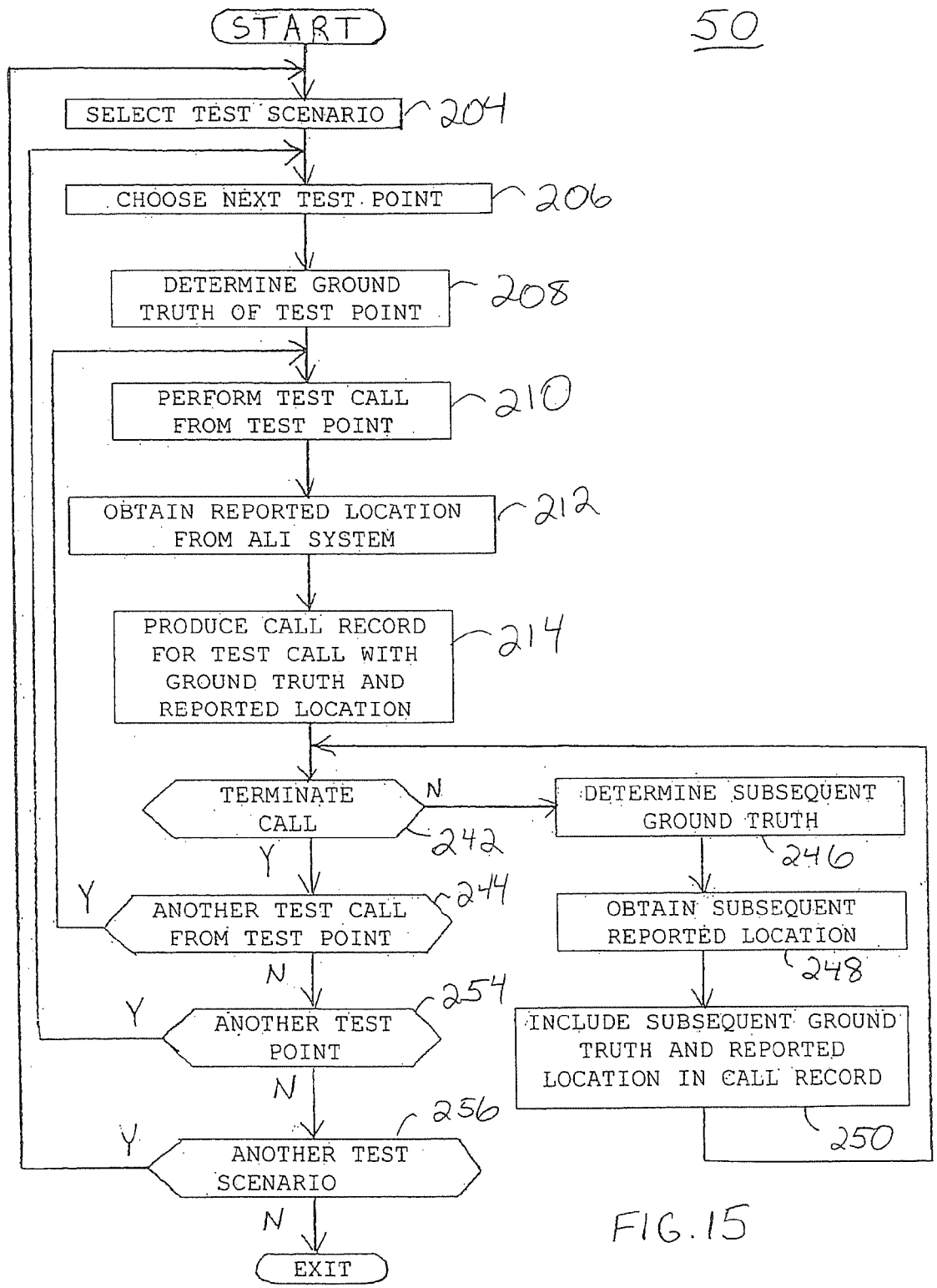
FIG. 15 shows a flow chart of an empirical test call execution subprocess of the ALI evaluation process of FIG. 2.

FIG. 15 shows a flow chart of empirical test call execution subprocess 50 of ALI evaluation process 38 (FIG. 2). Empirical test call execution subprocess 50 calls for performing test calls from the actual locations, represented by test points 200 (FIG. 14), determining the actual coordinates, i.e., ground truth, of the locations, obtaining a location estimate, i.e., reported location, from ALI system 36 (FIG. 1), and comparing the reported location with the ground truth.

Subprocess 50 begins with a task 204. At task 204, a next one of test scenarios 148 (FIG. 11) is selected from test point database 88 (FIG. 3). Subprocess 50 is only concerned with those unique calling environments represented by test scenarios 148 that are exhibited within validation region 144 (FIG. 9). As such, only those test scenarios 148 having test points 200 (FIG. 13) associated therewith in final test point set 94 (FIG. 13) of test point database 88 (FIG. 1) need be evaluated. In addition, during a first iteration of task 204, the "next" one of test scenarios 148, is a first test scenario 148.

Following task 204, a task 206 is performed. At task 206, a next test point 200 is chosen from final test point set 94 associated with the selected one of test scenarios 148. Of course, during a first iteration of task 206, the "next" one of test points 200, is a first test point 200.

In response to tasks 204 and 206, a task 208 determines a ground truth of the chosen one of test points 200. The ground truth may be the reference coordinates, expressed in latitude and longitude, of a test device, such as wireless communication device 24 (FIG. 1), being used to carry out empirical test call execution subprocess 50. Ground truth may be determined using differential global positioning satellite (GPS) techniques, by performing a professional survey, or by using a reference point with known coordinates.

The ground truth may be determined by using differential GPS when at least four satellites are "visible" to, i.e., detectable by, wireless communication device 24. Such a scenario is likely in rural areas of no or light foliage, suburban areas, some light and medium urban areas, and for highway scenarios. A professional survey may be performed to determine the ground truth if only three or less satellites are consistently "visible" to device 24 and a closest point at which at least four satellites are visible is at least one hundred meters away from test point 200.

Ground truth may be determined from a reference point with known coordinates in all other scenarios. For example, for a selected one of test points 200, a reference point may be selected according to the criteria that at the reference point, at least four satellites are clearly "visible" using a differential GPS receiver, and the reference point is less than one hundred meters away from test point 200. A compass and a linear measuring device, e.g., rolling wheel, tape, range finder, etc., are used to determine the distance and angle between the reference point and test point 200.

A task 210 is performed in conjunction with task 208. At task 210, a test call, simulating emergency call 22 (FIG. 1) is performed from test point 200. That is, an individual places the test call from the location in environment 20 (FIG. 1) corresponding to test point 200. The individual need not dial an emergency services number, such as "911". Rather, any number having a destination that is specifically designated for this application can be employed. While performing the test call, certain predetermined criteria are maintained for standardization across tests. This criteria includes for example, performing test calls of fixed duration, e.g., 30 sec, placement of wireless communication device 24 (FIG. 1) in a standard position next to a human head or phantom head to simulate the effects of head blockage, and so forth.

In response to task 210, a task 212 is performed. At task 212, a location estimate, or reported location, is obtained from ALI system 36 (FIG. 1). At this point in the execution of subprocess 50, computing system 56 (FIG. 1) may be serving as an answering point for receiving the test call and receiving the reported location from ALI system 36. During the duration of the test call, ALI system 36 (FIG. 1) deployed within environment 20 (FIG. 1) will be collecting measurements on signals received by ALI receivers at base stations 28 (FIG. 1).

When ALI system 36 utilizes a network-based technology, the collected measurements are processed by ALI system 36 to obtain time difference of arrival (TDOA) data and/or direction of arrival (DOA) data for angle of arrival (AOA) algorithms. These, along with signal measurement quality estimates, are used by ALI system 36 to obtain the reported location of device 24 originating the test call. Alternatively, when ALI system 36 utilizes a handset-based technology, the collected measurements from multiple Global Positioning System (GPS) satellites are processed by ALI system 36 to obtain the reported location.

Following task 212, a task 214 is performed. At task 214, a call record for the test call is produced. Referring to FIG. 16 in connection with task 214, FIG. 16 shows an diagram of call record database 96 stored in memory 62 (FIG. 3) that includes a plurality of call records 216 produced through the execution of empirical test call execution subprocess 50.

Each of call records 216 includes reference number 150, identifying one of test scenarios 148 (FIG. 11). A suffix 218 is added to reference number 150 to indicate a wireless service condition (i.e. "A" indicating a busy hour, "B" indicating an off peak time, and "C" indicating night time). Each of call records 216 further includes a trial number 220, a ground truth 222, expressed in a latitude 224 and a longitude 226, and a geolocation estimate, or reported location 228. Reported location 228 may be expressed in a latitude 230 and a longitude 232, and includes a time 234 that reported location 228 was determined. Each of call records 216 also includes a time 236 that the test call was originated, and a time 238 that reported location 228 was sent from ALI system 36 (FIG. 3) to the answering point, for example, processor 58 (FIG. 3).

Call records 216 may also include additional information for determining accuracy and latency of ALI system 36 (FIG. 3) as specified in the CDG Test Plan Document. The additional information includes, for example, altitude, speed (indicating movement of wireless communication device 24), and heading (direction of movement) for both ground truth 222 and reported location 228, and additional accuracy values for handset-based ALI systems, such as number of visible satellites, satellite identifiers, the ratio of received GPS carrier signal power to the power spectral density of background noise ($CN_o$) values per visible satellite, and horizontal dispersion of precision (HDOP) values.

At task 214 (FIG. 15) of test call execution subprocess 50, a first one of call records, designated first call record 216', is produced at task 214 for a first test call 240 (see FIG. 1) performed in environment 20 (FIG. 1) at a location corresponding to a first one of test points 200, designated first test point 200' (see FIG. 12). Following task 214, a query task 242 is performed.

At query task 242, a determination is made whether to terminate first test call 240. The duration of all test calls performed during the execution of empirical test call execution subprocess 50 should desirably last a predetermined duration, for example, thirty seconds. Query task 242 monitors the elapsed duration of first test call 240 from time 236 of call origination to determine whether first test call 240 is to be terminated. At query task 242, when the elapsed duration of first test call 240 is greater than or equal to the predetermined duration, first test call 240 is terminated and subprocess 50 proceeds to a query task 244 (discussed below). Alternatively, at query task 242 when the elapsed duration of first test call 240 is less than the predetermined duration, first test call 240 continues and subprocess 50 proceeds to a task 246.

At task 246, a subsequent ground truth 222 is determined, using the methods described above. In addition, a task 248, is performed during the continuance of first test call 240. At task 248, a subsequent reported location 228 is obtained from ALI system 36 (FIG. 3).

In response to task 246 and 248, a task 250 is performed to include the subsequent ground truth 222 and reported location 228 in call record database 96. Following task 250, subprocess 50 loops back to query task 242 to again determine whether first test call 240 is to be terminated.

When wireless communication device 24 (FIG. 1) is stationary, one or more subsequent measurements of reported location 228 allows ALI system 36 to estimate a more accurate location for reported location 228. Alternatively, when wireless communication device 24 is moving, one or more subsequent measurements of reported location 228 allows ALI system 36 to track the movement of wireless communication device 24. Referring momentarily to test scenario database (FIG. 11), one of test scenarios 148, identified by reference number 150 and labeled "R-13", includes condition 154 of "inside car, 30 mph." Thus, reference number 150, "R-13", represents a test scenario 148 in which wireless communication device 24 is moving.

With reference FIGS. 12 and 16, a second one of call records 216, designated second call record 216", is produced through the execution of subprocess 50 (FIG. 15) for a second test call 252 (see FIG. 1) performed in environment 20 (FIG. 1) at an initial location corresponding to a second one of test points 200, designated second test point 200" (see FIG. 12). Second test point 200" with suffixes "a", "b", and "c", (200a", 200b", 200c") represent movement (i.e. subsequent locations) at progressive instants in time of device 24 (FIG. 1). Accordingly, through the iteration of tasks 214, 242, 246, 248, and 250, second call record 216" includes multiple latitudes 224 and longitudes 226 for ground truth 222 and multiple latitudes 230, longitudes 232, and subsequent times 234 for the multiple estimates of reported location 228. That is, a time 234 of "$T2b_E$" follows a first instant of time 234 of "$T2a_E$", and a time 234 of "$T2c_e$" follows time 234 of "$T2b_E$".

Referring back to query ask 242 of subprocess 50, when the test call, such as first or second test calls 240 or 252 (FIG. 2) are terminated, subprocess proceeds to query task 244.

Query task 244 determines whether another test call is to be performed from the chosen one of test points 200, such as first or second test points 200' or 200" (FIG. 12). A comprehensive evaluation of ALI system 36 (FIG. 1) using empirical test call execution subprocess 50 is time consuming and costly due to the necessity of performing test calls from a number of locations corresponding to test points 200 (FIG. 14). Thus, it may be desirable to perform a fixed number of test calls, e.g. forty test calls, from the same location and determine ground truth 222 (FIG. 16) and reported location 228 (FIG. 16) for each of the test calls. As such, query task 244 determines whether another test call is to be performed from the location corresponding to the chosen one of test points 200. When another test call is to be performed, subprocess 50 loops back to task 210 to perform the test call and obtain reported location 228. However, at query task 244, when no further test calls are to be performed, subprocess 50 proceeds to a query task 254.

At query task 254, a determination is made whether another one of test points 200 is associated with the selected one of test scenarios 148 (FIG. 11). This is readily determined by consulting final set 94 (FIG. 14) of test points 200 (FIG. 14) in test point database 88 (FIG. 3). When there is another one of test points 200, subprocess 50 loops back to task 206 to choose the next one of test points 200 and subsequently perform test calls from the location in environment 20 (FIG. 1) corresponding to the next one of test points 200. However, at query task 254, when no further test points 200 for the selected one of test scenarios 148 is available, subprocess 50 proceeds to a query task 256.

At query task 256, a determination is made whether there is another one of test scenarios 148 exhibited within environment 20 (FIG. 1). This is readily determined by consulting test point database 88 (FIG. 3). When there is another one of test scenarios 148, subprocess 50 loops back to task 204 to select the next one of test scenarios 148, choose test points 200 correlated with the next one of test scenarios 148, and perform calls from the locations in environment 20 (FIG. 1) corresponding the test points 200. However, at query task 256, when no further test scenarios 148 are exhibited within environment 20, empirical test call execution subprocess 50 exits having performed a comprehensive evaluation of ALI system 36 (FIG. 1) deployed within validation region 144 (FIG. 9) and having generated call record database 96 (FIG. 16).

Figure 17:
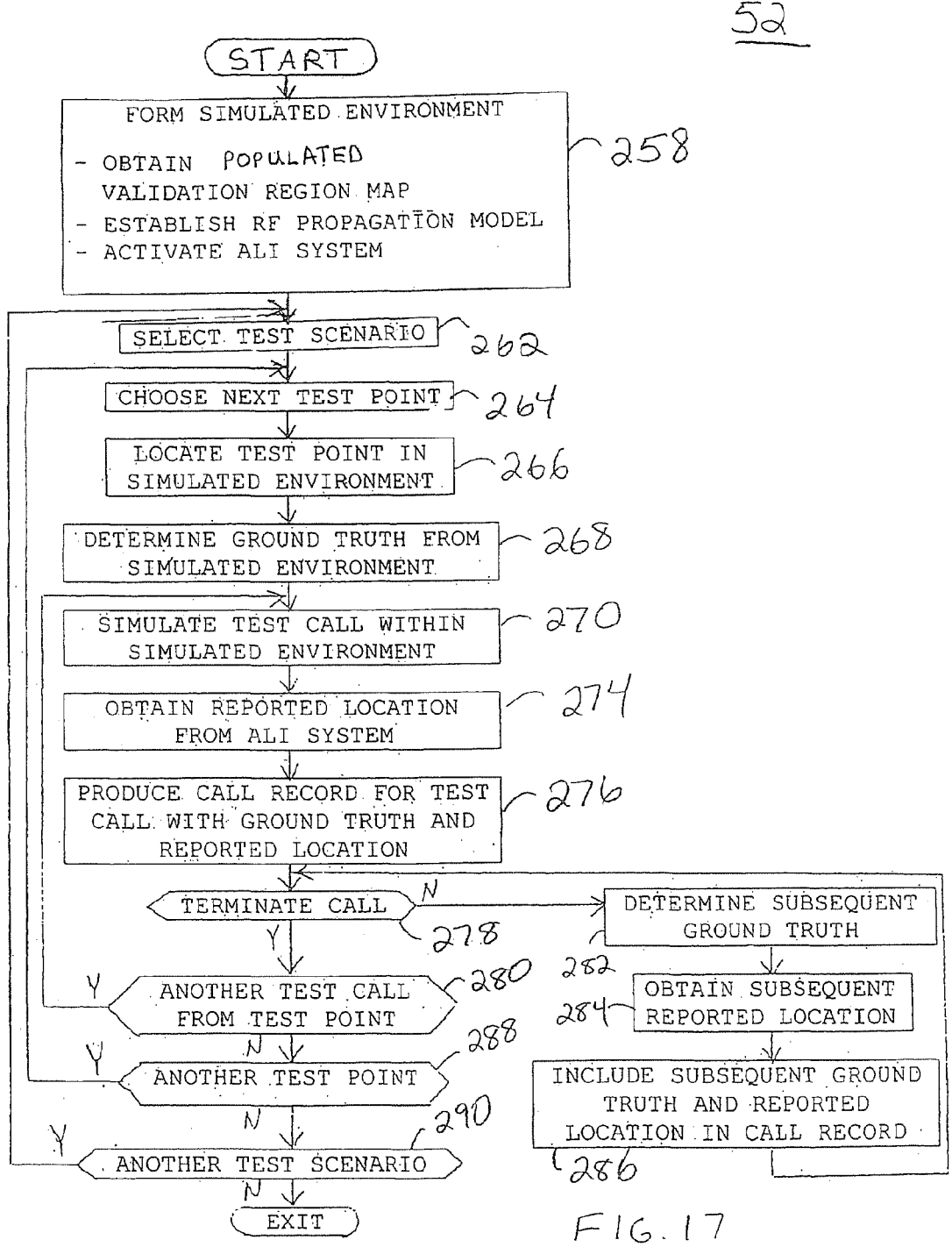
FIG. 17 shows a flow chart of a predictive test call execution subprocess of the ALI evaluation process of FIG. 2.

FIG. 17 shows a flow chart of predictive test call execution subprocess 52 of ALI evaluation process (FIG. 2). As discussed previously, a comprehensive evaluation of ALI system 36 using an empirical approach, such as empirical test call execution subprocess 50 (FIG. 15), is time consuming and costly. Accordingly, in a preferred embodiment, predictive test call execution subprocess 52 may be executed by processor 58 (FIG. 3) for some or all of test scenarios 148 (FIG. 11).

Predictive test call execution subprocess 52 begins with a task 258. Task 258 involves the formation of a simulated environment. Referring to FIG. 18 in connection with task 258, FIG. 18 shows a diagram of a simulated environment 260 formed through the implementation of the predictive test call execution subprocess 50 (FIG. 17) and stored in memory 62 (FIG. 3) as simulated environment database 98 (FIG. 3). Task 258 calls for obtaining populated validation region map 84 (FIG. 12) stored in memory 62 (FIG. 3) of computing system 56 (FIG. 3), and establishing RF signal propagation model 78 (FIG. 3) from storage device 63 (FIG. 3) within populated validation region map 84 to form simulated environment 260. ALI system 26 is subsequently activated, through simulation, within simulated environment 260.

RF signal propagation model 78 represents the propagation of RF communication signals through validation region 144 (FIG. 6). More specifically, RF signal propagation model 78 is implemented to predict the propagation of RF communication signals from transmitter locations, such as from base stations 28 (FIG. 1) and wireless communication devices 24 (FIG. 1), to characterize the behavior of signal loss as a function of propagation distance, and to account for other effects, such as terrain obstructions, sloping terrain, road orientation, buildings, and so forth. RF signal propagation model 78 may employ ray tracing techniques, image trees, and such known to those skilled in the art. The information produced by RF signal propagation model 78 includes predicted propagation paths of RF signals transmitted from various locations throughout wireless communication network 26 (FIG. 1) and relative signal strength, i.e., power, of the RF signals along the predicted propagation paths. The signal strength calculations along the predicted propagation paths are subsequently used by predictive test call execution subprocess 50 to simulate test calls within simulated environment 260.

Following task 258, the subsequent tasks of predictive test call execution subprocess 52 mimic the tasks of empirical test call execution subprocess 50 (FIG. 15), but are performed with respect to simulated environment 260.

Thus, subprocess 52 continues with a task 262. At task 262, a next one of test scenarios 148 (FIG. 11) is selected from final set 94 (FIG. 14) of test point database 88 (FIG. 3). Like subprocess 50, subprocess 52 is only concerned with those test scenarios 148 that are exhibited within validation region 144 (FIG. 9). As such, only those unique calling environments represented by test scenarios 148 having test points 200 (FIG. 13) associated therewith in final test point set 94 (FIG. 13) of test point database 88 (FIG. 1) need be evaluated. In addition, during a first iteration of task 262, the "next" one of test scenarios 148, is a first test scenario 148.

Following task 262, a task 264 is performed. At task 264, a next test point 200 (FIG. 14) is chosen from final test point set 94 (FIG. 14) associated with the selected one of test scenarios 148 (FIG. 11).

In response to tasks 262 and 264, a task 266 is performed. At task 266, processor 58 (FIG. 3) locates the next one of test points 200, chosen at task 264, within simulated environment 260. Referring momentarily to FIG. 18, a first one of test points 200, designated first test point 200', is located proximate one of buildings 168 in simulated environment 260.

Following task 268, a task 270 is performed to determine ground truth 222 (FIG. 16) within simulated environment 260. Ground truth 222 is available within the mapping databases that form populated validation region map 84 (FIG. 18) used to form simulated environment 260.

Following task 268, a test call is simulated from within simulated environment 260 from first test point 200'. The predicted propagation paths from various locations within populated validation region map 84 are known from RF signal propagation model 78. Thus, a test call 272 (FIG. 18) is initiated along the predicted propagation paths for reception at particular base stations 28 (FIG. 18) within simulated environment 260.

A task 274 is performed in response to task 270. At task 274, reported location 228 (FIG. 16) is obtained from ALI system 36 (FIG. 18) simulated within simulated environment 260. When ALI system 36 simulates a network-based technology, ALI system 36 estimates delay (angular) error for TDOA and AOA and the location error estimation (reported location 228) as a function of the delay (angle).

Following task 274, a task 276 causes processor 58 to produce a call record for the test call that includes ground truth 222 and reported location 228. The call record produced at task 276 is similar to those described in connection with task 214 (FIG. 15) of empirical test call execution subprocess 50, and may contain much the same information as do call records 216 of call record database 96 (FIG. 3).

Following task 276, a query task 278 is performed. Query task 278 is similar to query task 242 (FIG. 15) in that a determination is made whether to terminate simulated test call 272. When simulated test call 272 is terminated, subprocess 52 proceeds to a query task 280 (discussed below). However, when simulated test call 272 continues, subprocess 52 proceeds to tasks 282, 284, and 286.

Task 282 determines a subsequent ground truth 222. Task 284 obtains a subsequent reported location 228, and task 286 includes the subsequent ground truth 222 and reported location 228 in the call record, i.e., one of call records 216. Tasks 282, 284, and 286 are similar to tasks 246, 248, and 250 (FIG. 15) of empirical test call execution subprocess 50 (FIG. 15) and will not be described in further detail herein. Following task 286, subprocess 52 loops back to query task 278 to again determine whether simulated test call 272 is to be terminated.

When simulated test call 272 is terminated in response to query task 278, query task 280 determines whether another test call is to be simulated from the chosen one of test points 200, such as first test point 200' (FIG. 18). When query task 280 determines that another test call is to be simulated, subprocess 52 loops back to task 270 to simulate the test call in simulated environment 260 (FIG. 18) and obtain reported location 228. However, at query task 280, when no further test calls are to be simulated at first test point 200', subprocess 50 proceeds to a query task 288.

At query task 288, a determination is made whether another one of test points 200 is associated with the selected one of test scenarios 148 (FIG. 11). This is readily determined by consulting test point database 88 (FIG. 3). When there is another one of test points 200, subprocess 52 loops back to task 264 to choose the next one of test points 200 and subsequently simulate test calls from locations in simulated environment 260 (FIG. 18) corresponding to the next one of test points 200. However, at query task 254, when no further test points 200 for the selected one of test scenarios 148 is available, subprocess 52 proceeds to a query task 290.

At query task 290, a determination is made as to whether there is another one of test scenarios 148 (FIG. 11) exhibited within simulated environment 260 (FIG. 18). This is again readily determined by consulting test point database 88 (FIG. 3). When there is another one of test scenarios 148, subprocess 52 loops back to task 262 to select the next one of test scenarios 148, choose test points 200 correlated with the next one of test scenarios 148, and simulated test calls from the locations in simulated environment 260 (FIG. 18) corresponding test points 200. However, at query task 290, when no further test scenarios 148 are exhibited within environment 20, predictive test call execution subprocess 52 exits having efficiently performed a comprehensive evaluation of ALI system 36 (FIG. 1) through computer-based simulation, and having generated call record database 96 (FIG. 16).

Referring back to FIG. 2, following test call execution subprocess 46, that includes either or both of empirical test call execution subprocess 50 and predictive test call execution subprocess 52, ALI evaluation process 38 proceeds to analysis subprocess 48. At analysis subprocess 48, reported locations 228 (FIG. 16) of call record database 96 (FIG. 3) are compared with corresponding ground truths 222 (FIG. 16) within call record database 96, and report 100 (FIG. 3) is subsequently generated. Analysis subprocess 48 evaluates the accuracy of ALI system 32 (FIG. 3). The accuracy may be a measure that defines how close the reported locations 228 are to the ground truths 222. Analysis subprocess 48 also evaluates latency or the time needed from the instant of origination of a test call from the wireless communication device, time 236 (FIG. 16), to the instant reported location 228 is sent from ALI system 36, time 238 (FIG. 16). Other information that may be gleaned through analysis subprocess 48 is capacity, i.e. the maximum number of independent simultaneous location determinations ALI system 36 can sustain for a given wireless communication network load, and reliability, i.e., the total number of test calls that result in a reported location 228 relative to the total number of test calls, Analysis subprocess 48 may entail, for each test call, calculating the location error by determining the difference between reported location 228 and the corresponding ground truth 222. Analysis subprocess 48 can be performed using statistical techniques known to those skilled in the art. For example, the location error statistics can be plotted by generating a probability density function (pdf) and/or a cumulative distribution function (cdf). From the cumulative distribution function, the sixty-seventh percentile and the ninety-fifth percentile errors are determined, i.e., corresponding to the sixty-seventh percentile and the ninety-fifth percentile accuracy requirements specified in the FCC Phase II mandate for ALI systems. This error analysis may be repeated for each of test scenarios 148 tested.

Finally, for a comprehensive analysis of validation region 144 as a whole, the results are linearly combined for all test scenarios 148. The results may be linearly combined by weighting the results of test scenarios uniformly. Other linear combination techniques are to weight the results based on emergency call history, wireless call history, predictions on probabilities of making calls from the environments represented by the different test scenarios, and so forth.

In summary, the present invention teaches of a method and computing system for evaluating the accuracy of an automatic location identification system (ALI) deployed within a geographical region. The method and computing system evaluate an ALI system based on FCC accuracy and reliability requirements specified by the FCC Phase II mandate for wireless emergency call location. The present invention takes advantage of automated methodologies for identifying a validation region, classifying sub-regions within the validation region according to test scenarios set forth in the CDG Test Plan Document for Location Determination Technologies Evaluation, and selecting test points within the validation region from which test calls will be performed. In addition, the present invention teaches of predictive test call execution methodology for simulating test calls within an environment that simulates the actual environment. The automated tools and methodologies are utilized for repetitive tasks to minimize error and costs. In addition, the methodology and computing system described herein enable completion of comprehensive validations in a timely manner with minimum need for specialized staff, and are operable independent from the particular ALI technology deployed. Furthermore, the methodology and computing system can help to identify deployment upgrades in the ALI system due to changes in the environment (addition of man-made structures and land usage) and due to changes in the wireless communication network configuration.

Although the preferred embodiments of the invention have been illustrated and described in detail, it will be readily apparent to those skilled in the art that various modifications may be made therein without departing from the spirit of the invention or from the scope of the appended claims. For example, there is a great variation in the order in which many of the tasks described herein may be performed.

What is claimed is:

1. A method comprising:
    determining a validation region associated with a public assistance service area that is within a coverage area of a wireless communication network;
    selecting a test point within the validation region according to a testing scenario, wherein a test call is placed from the test point to obtain position information; and
    comparing the position information with location information output from a location identification system to determine accuracy of the location identification system for locating a wireless device within the validation region.

2. A method according to claim 1, wherein the public assistance service area includes a public safety answering point (PSAP), and the location identification system includes an automatic location identification (ALI) system.

3. A method according to claim 1, wherein the test scenario is among a plurality of test scenarios representing different calling environments.

4. A method according to claim 1, further comprising:
    obtaining a map of the service area;
    obtaining a map of the coverage area of the wireless communication network;
    selecting unit areas that are common to each of the maps; and
    compiling the unit areas to form a validation region map identifying the validation region.

5. A method according to claim 1, further comprising:
obtaining a validation region map of the validation region;
populating the validation region map with geographic and land use features of the validation region;
partitioning the validation region map into a plurality of sub-regions; and
correlating each of the sub-regions with one of a plurality of test scenarios.

6. A method according to claim 5, further comprising:
determining the testing scenario from a plurality of testing scenarios using a random selection process, wherein the test point is selected from within the sub-regions correlated with the selected test scenario.

7. A method according to claim 1, wherein a ground survey is conducted to ascertain that the test point is viable.

8. A method according to claim 1, wherein the test call is a simulation of a call originating from the wireless device at the test point.

9. A method according to claim 8, wherein the simulation utilizes an empirical methodology, a predictive methodology, or a combination thereof.

10. An apparatus comprising:
a processor configured to determine a validation region associated with a public assistance service area that is within a coverage area of a wireless communication network, and to select a test point within the validation region according to a testing scenario, wherein a test call is placed from the test point to obtain position information, the processor being further configured to compare the position information with location information output from a location identification system to determine accuracy of the location identification system for locating a wireless device within the validation region.

11. An apparatus according to claim 10, wherein the public assistance service area includes a public safety answering point (PSAP), and the location identification system includes an automatic location identification (ALI) system.

12. An apparatus according to claim 10, wherein the test scenario is among a plurality of test scenarios representing different calling environments.

13. An apparatus according to claim 10, wherein the processor is further configured to obtain a map of the service area and a map of the coverage area of the wireless communication network, the processor being further configured to select unit areas that are common to each of the maps, and to compile the unit areas to form a validation region map identifying the validation region.

14. An apparatus according to claim 10, wherein the processor is further configured to obtain a validation region map of the validation region and to populate the validation region map with geographic and land use features of the validation region, the processor being further configured to partition validation region map into a plurality of sub-regions and to correlate each of the sub-regions with one of a plurality of test scenarios.

15. An apparatus according to claim 14, wherein the processor is further configured to determine the testing scenario from a plurality of testing scenarios using a random selection process, the test point being selected from within the sub-regions correlated with the selected test scenario.

16. An apparatus according to claim 10, wherein a ground survey is conducted to ascertain that the test point is viable.

17. An apparatus according to claim 10, wherein the test call is a simulation of a call originating from the wireless device at the test point.

18. An apparatus according to claim 17, wherein the simulation utilizes an empirical methodology, a predictive methodology, or a combination thereof.

19. A method comprising:
generating a validation region map representing an overlap of a service area of a public safety answering point (PSAP) and a coverage area of a wireless communication network;
partitioning the validation region map into a plurality of sub-regions;
selecting one of a plurality of test scenarios, each of the test scenarios representing a unique calling environment in which an emergency call may occur;
correlating each of the sub-regions with the one test scenario;
determining test points in response to the one test scenario, wherein the test points exhibit the unique calling environment represented by the selected test scenario; and
calculating location error by determining differences between reported location by an automatic location identification (ALI) system and corresponding ground truth associated with test calls made from the test points.

20. A method according to claim 19, wherein the wireless communication includes one or more handsets each configured to place the emergency call.

* * * * *